(12) United States Patent
Huang et al.

(10) Patent No.: US 12,052,745 B2
(45) Date of Patent: Jul. 30, 2024

(54) UL TRANSMISSION CONTROL

(71) Applicant: QUALCOMM Incorporated, San Diego, CA (US)

(72) Inventors: Yi Huang, San Diego, CA (US); Wei Yang, San Diego, CA (US); Ahmed Elshafie, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 507 days.

(21) Appl. No.: 17/469,626

(22) Filed: Sep. 8, 2021

(65) Prior Publication Data

US 2022/0086850 A1 Mar. 17, 2022

Related U.S. Application Data

(60) Provisional application No. 63/079,165, filed on Sep. 16, 2020.

(51) Int. Cl.
| | |
|---|---|
| *H04W 72/56* | (2023.01) |
| *H04W 52/36* | (2009.01) |
| *H04W 72/0453* | (2023.01) |
| *H04W 72/21* | (2023.01) |

(52) U.S. Cl.
CPC ......... *H04W 72/56* (2023.01); *H04W 52/365* (2013.01); *H04W 72/0453* (2013.01); *H04W 72/21* (2023.01)

(58) Field of Classification Search
CPC .............. H04W 72/56; H04W 52/365; H04W 72/0453; H04W 72/21
See application file for complete search history.

(56) References Cited

U.S. PATENT DOCUMENTS

| | | | |
|---|---|---|---|
| 2023/0089138 A1* | 3/2023 | Wong | H04W 72/56 370/329 |
| 2023/0189255 A1* | 6/2023 | Bagheri | H04L 1/1812 370/329 |
| 2023/0337240 A1* | 10/2023 | Zhang | H04W 72/566 |

OTHER PUBLICATIONS

R1-2006345 Panasonic "Discussion on Intra-UE multiplexing and prioritization of different priority" 3GPP WG1 #102-e Aug. 17-28, 2020 (Year: 2020).*
International Search Report and Written Opinion—PCT/US2021/049695-ISA/EPO—Dec. 14, 2021 (208409WO).
(Continued)

*Primary Examiner* — Basil Ma
(74) *Attorney, Agent, or Firm* — Procopio, Cory, Hargreaves

(57) ABSTRACT

A UE may receive, from a base station, a first configuration associated with transmitting a low priority UL channel and a second configuration associated with transmitting a high priority UL channel concurrent in time with the low priority UL channel. The UE may cancel the transmission of the low priority UL channel to transmit the high priority UL channel independently, or multiplex the low priority UL channel with the high priority UL channel to transmit both the low priority UL channel and the high priority UL channel together based on a third configuration received from the base station or at least one condition. At least one condition includes a power headroom, a coding rate of high priority data/UCI, or a percentage of resource in high UL channel that is taken by low priority UL transmissions.

29 Claims, 11 Drawing Sheets

(56) References Cited

OTHER PUBLICATIONS

PANASONIC : "Discussion on Intra-UE Multiplexing and Prioritization of Different Priority", 3GPP Draft, R1-2006345, 3GPP TSG RAN WGI #102-E, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020,Aug. 7, 2020 (Aug. 7, 2020), XP051915316 , 4 Pages, Retrieved from the Internet :URL: https://ftp.3gpp.org/tsg_Ran/WG1_RL1/TSGR1_102-e/Docs/R1-2006345.zip R1-2006345.docx [retrieved on Aug. 7, 2020] paragraph [0002].

Qualcomm Incorporated: "UCI Enhancements for eURLLC", 3GPP Draft, 3GPP TSG-RAN WG1 #98, R1-1909575, UCI Enhancements for eURLLC, 3rd Generation Partnership Project (3GPP), Mobile Competence Centre, France, vol. RAN WG1, No. Prague, Czech Republic, Aug. 26, 2019-Aug. 30, 2019, Sep. 3, 2019 (Sep. 3, 2019), pp. 1-22, XP0517 66712 , Retrieved from internet: URL: http ://www.3gpp.org/ftp/tsg_ran/WG1_RL1 /TSGR1_98 / Docs /R1-190957 5.zip [retrieved on Sep. 3, 2019] paragraph [0003], the whole document.

ZTE: "Discussion on Intra-UE Multiplexing", 3GPP Draft, R1-1901774, 3GPP TSG RAN WG1 #96, Discussion on Intra-UE Multiplexing, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051599468, 7 Pages, Retrieved from the Internet: URL:http://www.3gpp.org/ftp/tsg%5Fran/WG1%5FRL1/TSGR1%5F96/Docs/R1%2D1901774%2Ezip [retrieved on Feb. 16, 2019] paragraph [02.6].

* cited by examiner

UL TRANSMISSION CONTROL

CROSS REFERENCE TO RELATED APPLICATION(S)

This application claims the benefit of and priority to U.S. Provisional Application Ser. No. 63/079,165, entitled "METHODS AND APPARATUS FOR UL TRANSMISSION CONTROL" and filed on Sep. 16, 2020, which is expressly incorporated by reference herein in its entirety.

TECHNICAL FIELD

The present disclosure relates generally to communication systems, and more particularly, to a wireless communication for controlling uplink (UL) transmissions with different priorities.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. A UE may receive, from a base station, a first configuration associated with transmitting a low priority UL channel having a low priority and a second configuration associated with transmitting a high priority UL channel concurrent in time with at least a part of a transmission of the low priority UL channel, and cancel the transmission of the low priority UL channel to transmit the high priority UL channel independently, or multiplex the low priority UL channel with the high priority UL channel to transmit both the low priority UL channel and the high priority UL channel together based on a third configuration received from the base station or at least one condition. In one aspect, the UE may receive the third configuration from the base station indicating the UE to cancel the transmission of the low priority UL channel and transmit the high priority UL channel independently, or to multiplex the low priority UL channel with the high priority UL channel and transmit both the low priority UL channel and the high priority UL channel together. In another aspect, the UE may determine whether to cancel the transmission of the low priority UL channel to transmit the high priority UL channel independently, or to multiplex the low priority UL channel with the high priority UL channel to transmit both the low priority UL channel and the high priority UL channel together based on the at least one condition.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
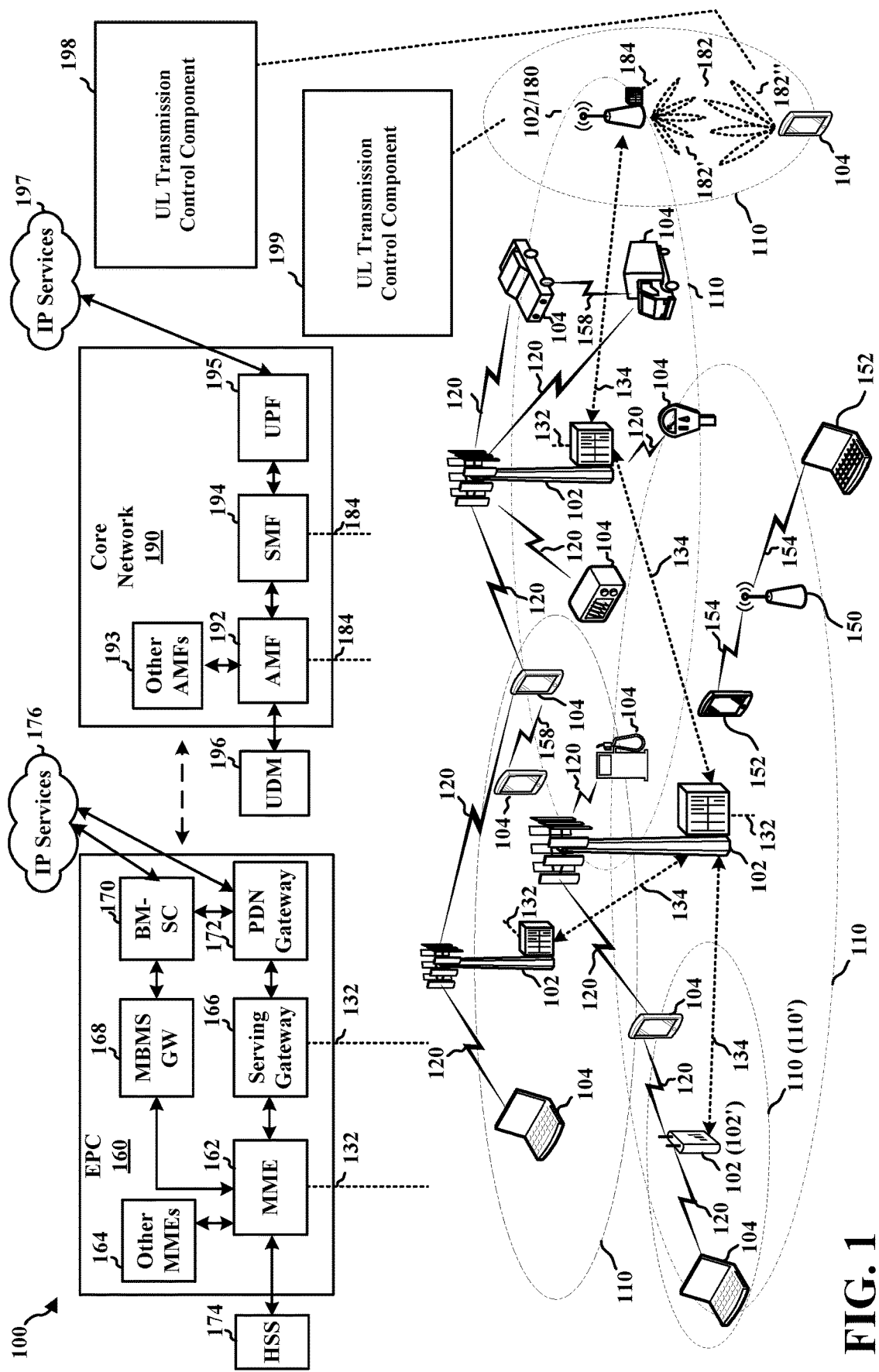
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a UL transmission control component 198 configured to receive, from a base station, a first configuration associated with transmitting a first UL channel having a first priority, receive, from the base station, a second configuration associated with transmitting a second UL channel concurrent in time with at least a part of a transmission of the first UL channel, the second UL channel having a second priority greater than the first priority, receive, from the base station, a third configuration indicating the UE to cancel the transmission of the first UL channel and transmit the second UL channel independently, or to multiplex the first UL channel with the second UL channel and transmit both the first UL channel and the second UL channel together, and cancel the transmission of the first UL channel to transmit the second UL channel independently, or multiplex the first UL channel with the second UL channel to transmit both the first UL channel and the second UL channel together based on the third configuration received from the base station. In certain aspects, the UE 104 may include the UL transmission control component 198 configured to receive, from a base station, a first configuration associated with transmitting a first UL channel having a first priority, receive, from the base station, a second configuration associated with transmitting a second UL channel concurrent in time with at least a part of a transmission of the first UL channel, the second UL channel having a second priority greater than the first priority, and determine whether to cancel the transmission of the first UL channel to transmit the second UL channel independently, or to multiplex the first UL channel with the second UL channel to transmit both the first UL channel and the second UL channel together. In certain aspects, the base station 180 may include a UL transmission control component 199 configured to receive, from to a UE, capability information indicating a capability of the UE, the capability being whether the UE supports each of cancelling a transmission of a first UL channel and transmitting a second UL channel independently, or multiplexing the first UL channel with the second UL channel and transmitting both the first UL channel and the second UL channel together, transmit, to the UE, a first configuration associated with receiving a first UL channel having a first priority, transmit, to the UE, a second configuration associated with receiving a second UL channel concurrent in time with at least a part of the transmission of the first UL channel, the second UL channel having a second priority greater than the first priority, where the first UL channel is canceled or multiplexed with the second UL channel. Although the following description may be focused on 5G NR, the concepts described herein may be applicable to other similar areas, such as LTE, LTE-A, CDMA, GSM, and other wireless technologies.

Figure 2:
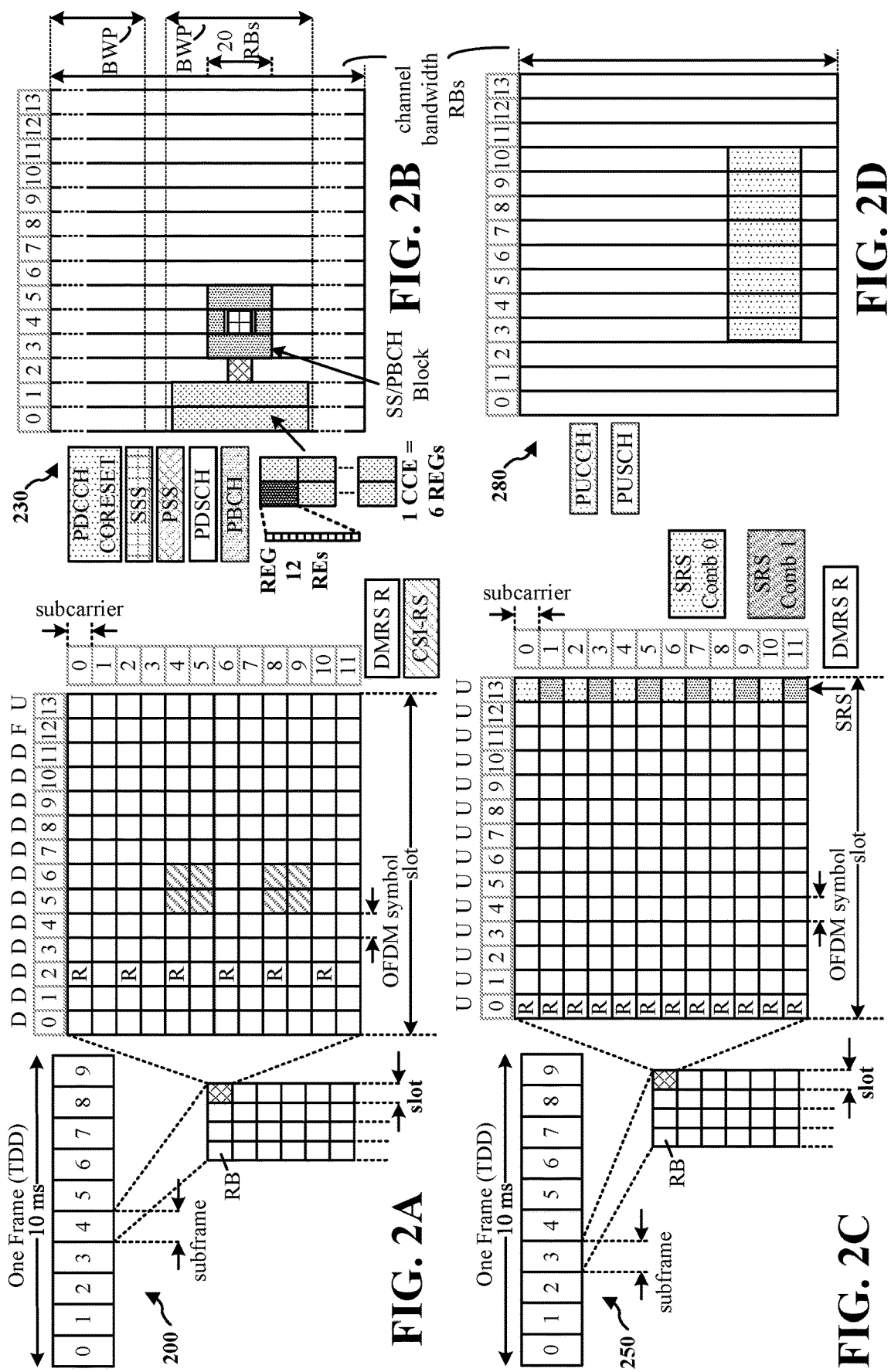
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
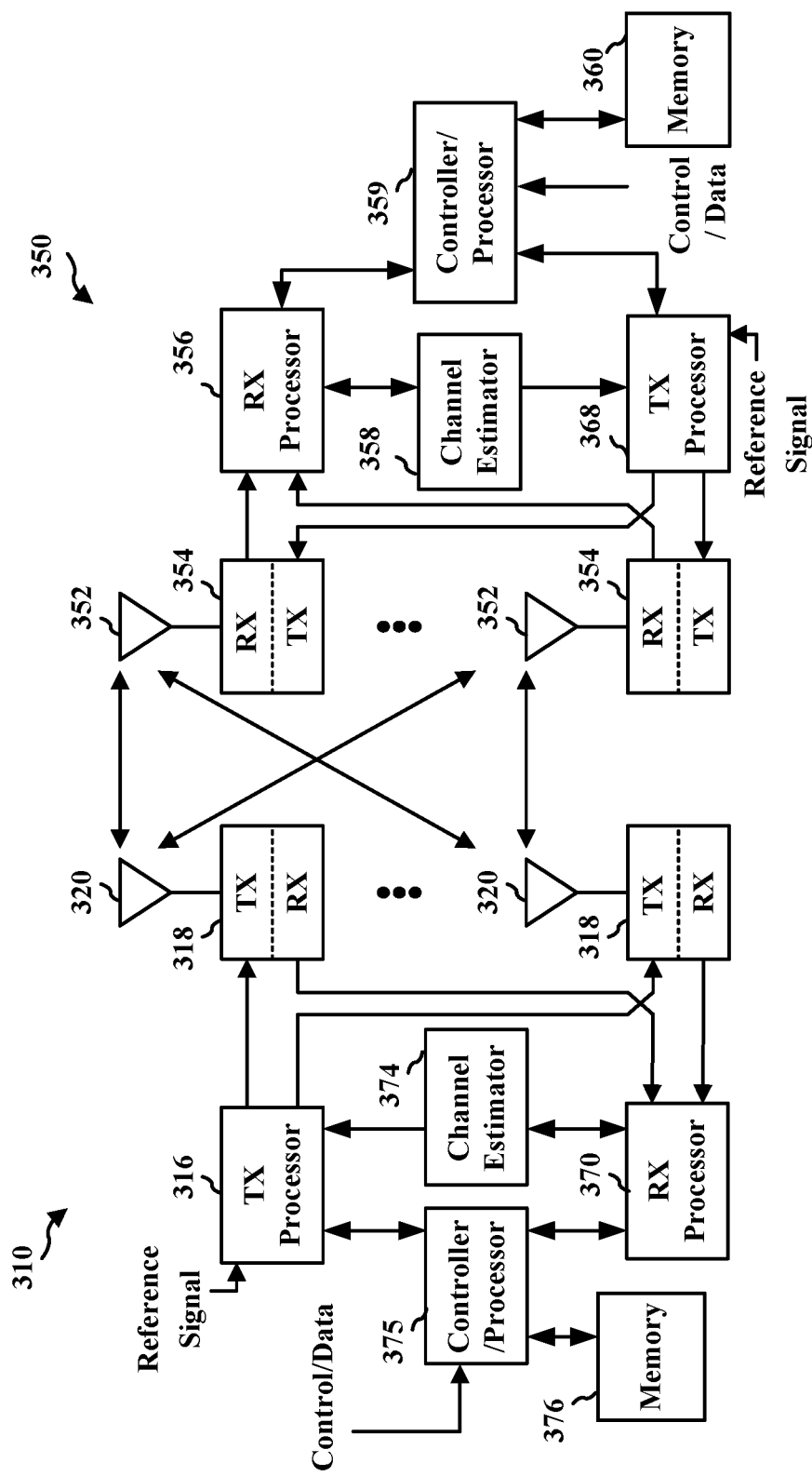
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

A base station may schedule a UE to send UL transmissions. That is, the base station may transmit configuration associated with transmitting a UL channel, and the UE may transmit the UL channel as scheduled based on the configuration received from the base station. The configuration may be a periodic or semi-static scheduling including radio resource control (RRC) message, or a dynamic scheduling including a media access control (MAC) control element (CE) (MAC-CE) or downlink control information (DCI).

The UE may be limited in that it cannot transmit two parallel channels in the same carrier at the same time. That is, when two UL transmissions with different priorities are scheduled to overlap or collide, the UE may determine to follow a behavior on how to transmit the two overlapping or colliding UL transmissions with different priorities. Here, overlapping or colliding UL transmissions may refer to two parallel UL transmissions that are scheduled to overlap with each other in the time domain. The two UL transmissions with different priorities may include a low priority UL transmission and a high priority UL transmission. For example, the low priority UL transmission may include one of a physical uplink control channel (PUCCH) that includes low priority hybrid automatic repeat request (HARQ) acknowledgment (ACK) or negative (ACK) (NACK) (HARQ-ACK/NACK), or a PUCCH that includes low priority channel state information (CSI) feedback. The high priority UL transmission may include one of a physical uplink shared channel (PUSCH) that includes data, a PUCCH that includes high priority CSI feedback, or a PUSCH that includes data and high priority CSI feedback.

In one aspect, the UE may follow a first behavior of cancelling a low priority UL transmission when two UL transmissions with different priorities overlap or collide. For example, when a low priority HARQ-ACK and a high priority PUSCH are scheduled to overlap with each other in the time domain, the low priority HARQ-ACK may be canceled, and the high priority PUSCH may be transmitted. That is, according to the first behavior, the UE may cancel the low priority HARQ-ACK and transmit the high priority PUSCH in response to the low priority HARQ-ACK and the high priority PUSCH being scheduled to overlap with each other in the time domain.

In another aspect, the UE may follow a second behavior of multiplexing the low priority UL transmission with the high priority UL transmission and transmit the multiplexed transmission together to the base station. That is, the UL transmissions with different priorities may be multiplexed and transmitted together. For example, when a low priority HARQ-ACK overlaps with a high priority PUSCH, the low priority HARQ-ACK may be multiplexed on high priority PUSCH and transmitted together. That is, the UE may multiplex the low priority HARQ-ACK on the high priority PUSCH and transmit both the lower priority HARQ-ACK and the high priority PUSCH together to the base station. The multiplexed UL transmission may be a single channel transmission that carries both contents of the low priority information and the high priority information.

The UE may support both behaviors for backward compatibility, and the UE may decide which behavior to follow when UL transmissions with different priorities overlap or collide. That is, the UE may be configured to support both behaviors for backward compatibility, and the UE may follow one of the behaviors when the UL transmissions with different priorities overlap or collide with each other. In one aspect, when a low priority UL transmission and a high priority UL transmission are scheduled to overlap or collide at least partially with each other in the time domain, the UE may follow the first behavior of cancelling the low priority UL transmission and to transmit the high priority UL transmission independently. In another aspect, when low priority UL transmission and the high priority UL transmission are scheduled to overlap or collide at least partially with each other in the time domain, the UE may follow the second behavior of multiplexing the low priority UL channel with the high priority UL channel and transmit both the low priority UL channel and the high priority UL channel together.

The base station may explicitly signal the UE and indicate the UE to follow one of the UL transmission behaviors for overlapping or colliding UL transmissions. First, a UE may transmit a capability signaling to the base station to report the capability of the UE, indicating whether the UE supports either behavior to handle the overlapping or colliding UL transmissions with different priorities. That is, the UE may transmit the signaling to the base station to indicate whether the UE supports the first behavior of cancelling the low priority UL transmission and/or the second behavior of multiplexing the low priority UL transmission with the high priority UL transmission when two UL transmissions with different priorities overlap or collide.

Then, the base station may use an explicit signal to inform the UE to follow either of the behaviors. That is, the base station may transmit a signal to the UE and indicate the UE which behavior the UE may follow among the behaviors supported by the UE. The signaling from the base station to the UE may be transmitted via at least one of an RRC signaling, a MAC-CE, and/or DCI. That is, the base station may semi-persistently transmit the signaling via the RRC signaling, and dynamically transmit the signaling via the MAC-CE and the DCI.

In some aspects, the UE may decide which behavior to follow. Based on certain conditions, UE may implicitly derive which behavior the UE may follow to handle collision among UL transmissions with different priorities. That is, the UE may implicitly determine which behavior to follow to handle the overlapping or colliding UL transmissions based on conditions. In one aspect, when the UE determines that a low priority UL transmission and a high priority UL transmission are scheduled to overlap or collide at least partially with each other in the time domain, the UE may determine to follow the first behavior of cancelling the low priority UL transmission and to transmit the high priority UL transmission independently. In another aspect, when the UE determines that a low priority UL transmission and a high priority UL transmission are scheduled to overlap or collide at least partially with each other in the time domain, the UE may determine to follow the second behavior of multiplexing the low priority UL channel with the high priority UL channel and transmit both the low priority UL channel and the high priority UL channel together. The conditions may include, but not limited to, a power headroom, a coding rate of high priority data/UCI, or a percentage of resource in high UL channel that is taken by low priority UL transmissions.

In one aspect, the UE may determine which behavior to follow to handle the overlapping or colliding UL transmissions based on the power headroom. The UE may first follow the second behavior and multiplex the low priority UL transmission with the high priority UL transmission and check the power headroom after multiplexing. If the transmission power of the multiplexed UL transmission reaches or exceeds a threshold value (e.g., the maximum transmission power) of UE capability, the UE may determine to follow the first behavior of cancelling the low priority UL transmission. That is, if the power headroom at the UE to transmit the multiplexed UL transmission is equal to or less than a power headroom threshold, the UE may determine to cancel the transmission of the low priority UL transmission and determine to transmit the high priority UL transmission. If the transmission power of the multiplexed UL transmission reaches or exceeds a threshold value (e.g., the maximum transmission power) of UE capability, the UE may determine to follow the second behavior of transmitting the multiplexed UL transmission to the base station. That is, if the power headroom at the UE to transmit the multiplexed UL transmission is greater than a power headroom threshold, the UE may determine to transmit the high priority UL transmission multiplexed with the low priority UL transmission.

In another aspect, the UE may determine which behavior to follow to handle the overlapping or colliding UL transmissions based on the coding rate of high priority data/UCI multiplexed with the low priority data. When the low priority UL transmission is multiplexed to the high priority UL transmission, the low priority transmission may take some resources from the high priority channel, impacting the coding rate of the high priority channel. If the coding rate of the high priority UL transmission is pushed too high, the high priority UL transmission may become less reliable. Therefore, the UE may first follow the second behavior and multiplex the low priority UL transmission with the high priority UL transmission and may check the coding rate of the multiplexed high priority UL transmission. If the coding rate of the multiplexed high priority UL transmission is greater than a threshold value, the UE may determine to follow the first behavior of cancelling the low priority UL transmission and transmitting the high priority transmission. If the coding rate of the multiplexed high priority UL transmission is equal to or smaller than the threshold value, the UE may determine to follow the second behavior and transmit the multiplexed UL transmission to the base station.

In another aspect, the UE may determine which behavior to follow to handle the overlapping or colliding UL transmissions based on the percentage of the resource assigned to low priority UL transmissions. The UE may first follow the second behavior and multiplex the low priority UL transmission with the high priority UL transmission, and check the percentage of the resource assigned to the low priority UL transmissions. If the percentage of the resource assigned to the low priority UL transmissions is greater than a threshold value, the UE may determine to follow the first behavior of cancelling the low priority UL transmission and transmitting the high priority transmission. If the percentage of the resource assigned to the low priority UL transmissions is equal to or smaller than the threshold value, the UE may determine to follow the second behavior and transmit the multiplexed UL transmission to the base station.

Figure 4:
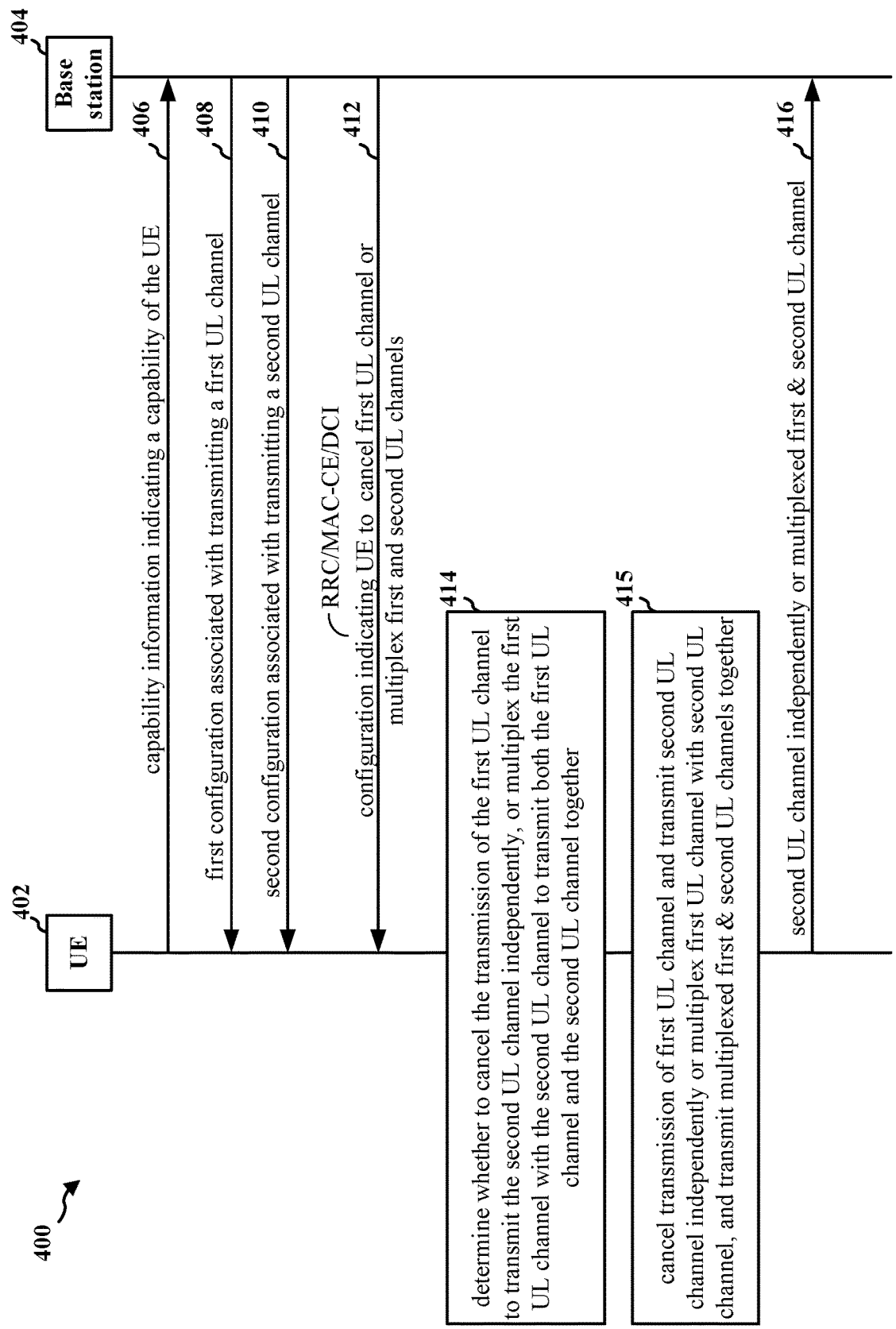
FIG. 4 is a call-flow diagram of wireless communication.

FIG. 4 is a call-flow diagram 400 of wireless communication, including a UE 402 and a base station 404. When a low priority UL channel and a high priority UL channel are scheduled to overlap or collide at least partially with each other, the UE 402 may cancel the low priority UL channel or multiplex the low priority UL channel and the high priority UL channel.

At 406, the UE 402 may transmit, to the base station 404, capability information indicating a capability of the UE 402, the capability refers to whether the UE 402 may support each of canceling the transmission of the low priority UL channel to transmit the high priority UL channel independently, or multiplexing the low priority UL channel with the high priority UL channel to transmit both the low priority UL channel and the high priority UL channel together. The base station 404 may receive, from the UE 402, the capability information indicating a capability of the UE 402, the capability refers to whether the UE 402 may support each of canceling the transmission of the low priority UL channel to transmit the high priority UL channel independently, or multiplexing the low priority UL channel with the high priority UL channel to transmit both the low priority UL channel and the high priority UL channel together. The base station 404 may configure the UE 402 to cancel the low priority UL channel or multiplex the low priority UL channel and the high priority UL channel based on the capability information received from the UE 402.

At 408, the UE 402 may receive, from the base station 404, a first configuration associated with transmitting a first UL channel to the base station 404, the first UL channel having a first priority. The base station 404 may transmit, to the UE 402, the first configuration associated with receiving the first UL channel from the UE 402, the first UL channel having a first priority. That is, the first configuration to the UE 402 may include a grant from the base station 404 to the UE 402 scheduling a transmission of the first UL channel. The first priority may be a low priority. For example, the first UL channel may be one of a PUCCH that includes low priority HARQ-ACK/NACK, or a PUCCH that includes low priority CSI feedback. The configuration may be received through at least one of the RRC signaling, the MAC-CE, and/or the DCI.

At 410, the UE 402 may receive, from the base station 404, a second configuration associated with transmitting a second UL channel to the base station 404 concurrent in time with at least a part of the transmission of the first UL channel, the second UL channel having a second priority greater than the first priority. The base station 404 may transmit, to the UE 402, a second configuration associated with receiving a second UL channel from the UE 402 concurrent in time with at least a part of the transmission of the first UL channel, the second UL channel having a second priority greater than the first priority. That is, the second configuration to the UE 402 may include a grant from the base station 404 to the UE 402 scheduling a transmission of the second UL channel. The second priority may be a high priority. For example, the second UL channel may be one of a PUSCH that includes data, a PUCCH that includes high priority CSI feedback, or a PUSCH that includes data and high priority CSI feedback. The configuration may be received through at least one of the RRC signaling, the MAC-CE, and/or the DCI.

In one aspect, the base station 404 may explicitly signal the UE 402 and indicate the UE 402 to follow one of the UL transmission behaviors for overlapping or colliding UL transmissions. At 412, the UE 402 may receive, from the base station 404, a configuration indicating the UE 402 to cancel the transmission of the first UL channel and transmit the second UL channel independently, or to multiplex the first UL channel with the second UL channel and transmit both the first UL channel and the second UL channel together. The base station 404 may transmit configuration indicating the UE 402 to cancel the transmission of the first UL channel a third and transmit the second UL channel independently, or to multiplex the first UL channel with the second UL channel and transmit both the first UL channel and the second UL channel together. The base station 404 may configure the UE 402 to cancel the first UL channel or multiplex the first UL channel and the second UL channel based on the capability information received at 406.

In another aspect, the UE 402 may decide which UL transmission behaviors to follow for the overlapping or colliding UL transmissions. At 414, the UE 402 may determine whether to cancel the transmission of the first UL channel to transmit the second UL channel independently or to multiplex the first UL channel with the second UL channel to transmit both the first UL channel and the second UL channel together, based on at least one condition. The at least one condition may include a power headroom, a coding rate of multiplexed high priority data/UCI, and a percentage of resource in the multiplexed high UL channel that is taken by low priority UL transmissions.

At 415, the UE 402 may cancel the transmission of the first UL channel to transmit the second UL channel independently or multiplex the first UL channel with the second UL channel to transmit both the first UL channel and the second UL channel together based on the configuration received at 412 or the determination at 414. In one aspect, the UE 402 may cancel the transmission of the first UL channel to transmit the second UL channel independently or multiplex the first UL channel with the second UL channel to transmit both the first UL channel and the second UL channel together based on the configuration received from the base station 404 at 412. In another aspect, the UE 402 may cancel the transmission of the first UL channel to transmit the second UL channel independently or multiplex the first UL channel with the second UL channel to transmit both the first UL channel and the second UL channel together based on the determination based on the at least one condition at 414.

At 416, the UE 402 may transmit the second UL channel independently upon determining to cancel the transmission of the first UL channel and transmit the second UL channel independently, or transmit the first UL channel multiplexed with the second UL channel to transmit both the first UL channel and the second UL channel together upon determining to multiplex the first UL channel with the second UL channel and transmit both the first UL channel and the second UL channel together. The base station 404 may receive, from the UE 402, the second UL channel independent from the first UL channel or the first UL channel and the second UL channel multiplexed with each other. In one aspect, the UE 402 may transmit, to the base station 404, the second UL channel independently based on the configuration received from the base station 404 at 412 or the determination based on the at least one condition at 414. In another aspect, the UE 402 may transmit the first UL channel multiplexed with the second UL channel to transmit, to the base station 404, both the first UL channel and the second UL channel together based on the configuration received from the base station 404 at 412 or the determination based on the at least one condition at 414.

Figure 5:
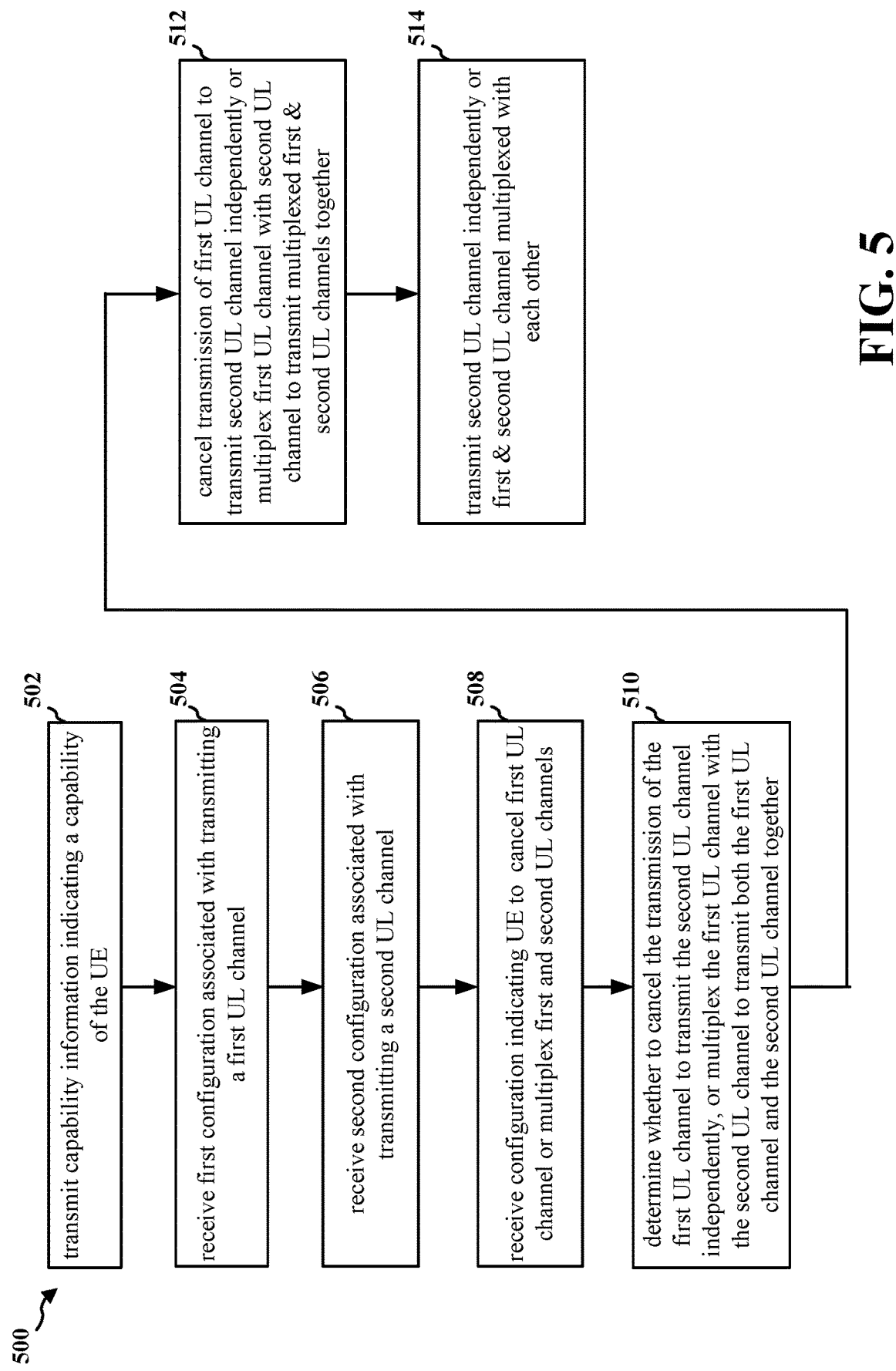
FIG. 5 is a flowchart of a method of wireless communication.

FIG. 5 is a flowchart 500 of a method of wireless communication. The method may be performed by a UE (e.g., the UE 104/402; the apparatus 1002). When a low priority UL channel and a high priority UL channel are scheduled to overlap or collide at least partially with each other, the UE may cancel the low priority UL channel or multiplex the low priority UL channel and the high priority UL channel.

At 502, the UE may transmit, to the base station, capability information indicating a capability of the UE, the capability refers to whether the UE may support each of canceling the transmission of the low priority UL channel to transmit the high priority UL channel independently, or multiplexing the low priority UL channel with the high priority UL channel to transmit both the low priority UL channel and the high priority UL channel together. The base station may configure the UE to cancel the low priority UL channel or multiplex the low priority UL channel and the high priority UL channel based on the capability information received from the UE. For example, at 406, the UE 402 may transmit, to the base station 404, capability information indicating a capability of the UE 402, the capability refers to whether the UE 402 may support each of canceling the transmission of the low priority UL channel to transmit the high priority UL channel independently, or multiplexing the low priority UL channel with the high priority UL channel to transmit both the low priority UL channel and the high priority UL channel together. Furthermore, 502 may be performed by a UE capability indicating component 1040.

At 504, the UE may receive, from the base station, a first configuration associated with transmitting a first UL channel to the base station, the first UL channel having a first priority. That is, the first configuration to the UE may include a grant from the base station to the UE scheduling a transmission of the first UL channel. The first priority may be a low priority. For example, the first UL channel may be one of a PUCCH that includes low priority HARQ-ACK/NACK, or a PUCCH that includes low priority CSI feedback. The configuration may be received through at least one of the RRC signaling, the MAC-CE, and/or the DCI. For example, at 408, the UE 402 may receive, from the base station 404, a first configuration associated with transmitting a first UL channel to the base station 404, the first UL channel having a first priority. Furthermore, 504 may be performed by a UL configuration component 1042.

At 506, the UE may receive, from the base station, a second configuration associated with transmitting a second UL channel to the base station concurrent in time with at least a part of the transmission of the first UL channel, the second UL channel having a second priority greater than the first priority. That is, the second configuration to the UE may include a grant from the base station to the UE scheduling a transmission of the second UL channel. The second priority may be a high priority. For example, the second UL channel may be one of a PUSCH that includes data, a PUCCH that includes high priority CSI feedback, or a PUSCH that includes data and high priority CSI feedback. The configuration may be received through at least one of the RRC signaling, the MAC-CE, and/or the DCI. For example, at 410, the UE 402 may receive, from the base station 404, a second configuration associated with transmitting a second UL channel to the base station 404 concurrent in time with at least a part of the transmission of the first UL channel, the second UL channel having a second priority greater than the first priority. Furthermore, 506 may be performed by the UL configuration component 1042.

In one aspect, the base station may explicitly signal the UE and indicate the UE to follow one of the UL transmission behaviors for overlapping or colliding UL transmissions. At 508, the UE may receive, from the base station, a configuration indicating the UE to cancel the transmission of the first UL channel and transmit the second UL channel independently, or to multiplex the first UL channel with the second UL channel and transmit both the first UL channel and the second UL channel together. The base station may configure the UE to cancel the first UL channel or multiplex the first UL channel and the second UL channel based on the capability information received at 502. For example, at 412, the UE 402 may receive, from the base station 404, a configuration indicating the UE 402 to cancel the transmission of the first UL channel and transmit the second UL channel independently, or to multiplex the first UL channel with the second UL channel and transmit both the first UL channel and the second UL channel together. Furthermore, 508 may be performed by the UL configuration component 1042.

In another aspect, the UE may decide which UL transmission behaviors to follow for the overlapping or colliding UL transmissions. At 510, the UE may determine whether to cancel the transmission of the first UL channel to transmit the second UL channel independently or to multiplex the first UL channel with the second UL channel to transmit both the first UL channel and the second UL channel together, based on at least one condition. The at least one condition may include a power headroom, a coding rate of multiplexed high priority data/UCI, and a percentage of resource in the multiplexed high UL channel that is taken by low priority UL transmissions. For example, at 414, the UE 402 may determine whether to cancel the transmission of the first UL channel to transmit the second UL channel independently or to multiplex the first UL channel with the second UL channel to transmit both the first UL channel and the second UL channel together, based on at least one condition. Furthermore, 510 may be performed by a UL transmission control component 1044.

At 512, the UE may cancel the transmission of the first UL channel to transmit the second UL channel independently or multiplex the first UL channel with the second UL channel to transmit both the first UL channel and the second UL channel together based on the configuration received at 508 or the determination at 510. In one aspect, the UE may cancel the transmission of the first UL channel to transmit the second UL channel independently or multiplex the first UL channel with the second UL channel to transmit both the first UL channel and the second UL channel together based on the configuration received from the base station at 508. In another aspect, the UE may cancel the transmission of the first UL channel to transmit the second UL channel independently or multiplex the first UL channel with the second UL channel to transmit both the first UL channel and the second UL channel together based on the determination based on the at least one condition at 510. For example, at 415, the UE 402 may cancel the transmission of the first UL channel to transmit the second UL channel independently or multiplex the first UL channel with the second UL channel to transmit both the first UL channel and the second UL channel together based on the configuration received at 412 or the determination at 414. Furthermore, 512 may be performed by the UL transmission control component 1044.

At 514, the UE may transmit the second UL channel independently upon determining to cancel the transmission of the first UL channel to transmit the second UL channel independently, or transmit the first UL channel multiplexed with the second UL channel to transmit both the first UL channel and the second UL channel together upon determining to multiplex the first UL channel with the second UL channel to transmit both the first UL channel and the second UL channel together. In one aspect, the UE may cancel the transmission of the first UL channel and transmit, to the base station, the second UL channel independently based on the configuration received from the base station at 508 or the determination based on the at least one condition at 510. In another aspect, the UE may multiplex the first UL channel with the second UL channel and transmit, to the base station, both the first UL channel and the second UL channel together based on the configuration received from the base station at 508 or the determination based on the at least one condition at 510. For example, at 416, the UE 402 may transmit the second UL channel independently upon determining to cancel the transmission of the first UL channel to transmit the second UL channel independently, or transmit the first UL channel multiplexed with the second UL channel to transmit both the first UL channel and the second UL channel together upon determining to multiplex the first UL channel with the second UL channel to transmit both the first UL channel and the second UL channel together. Furthermore, 514 may be performed by the UL transmission control component 1044.

Figure 6:
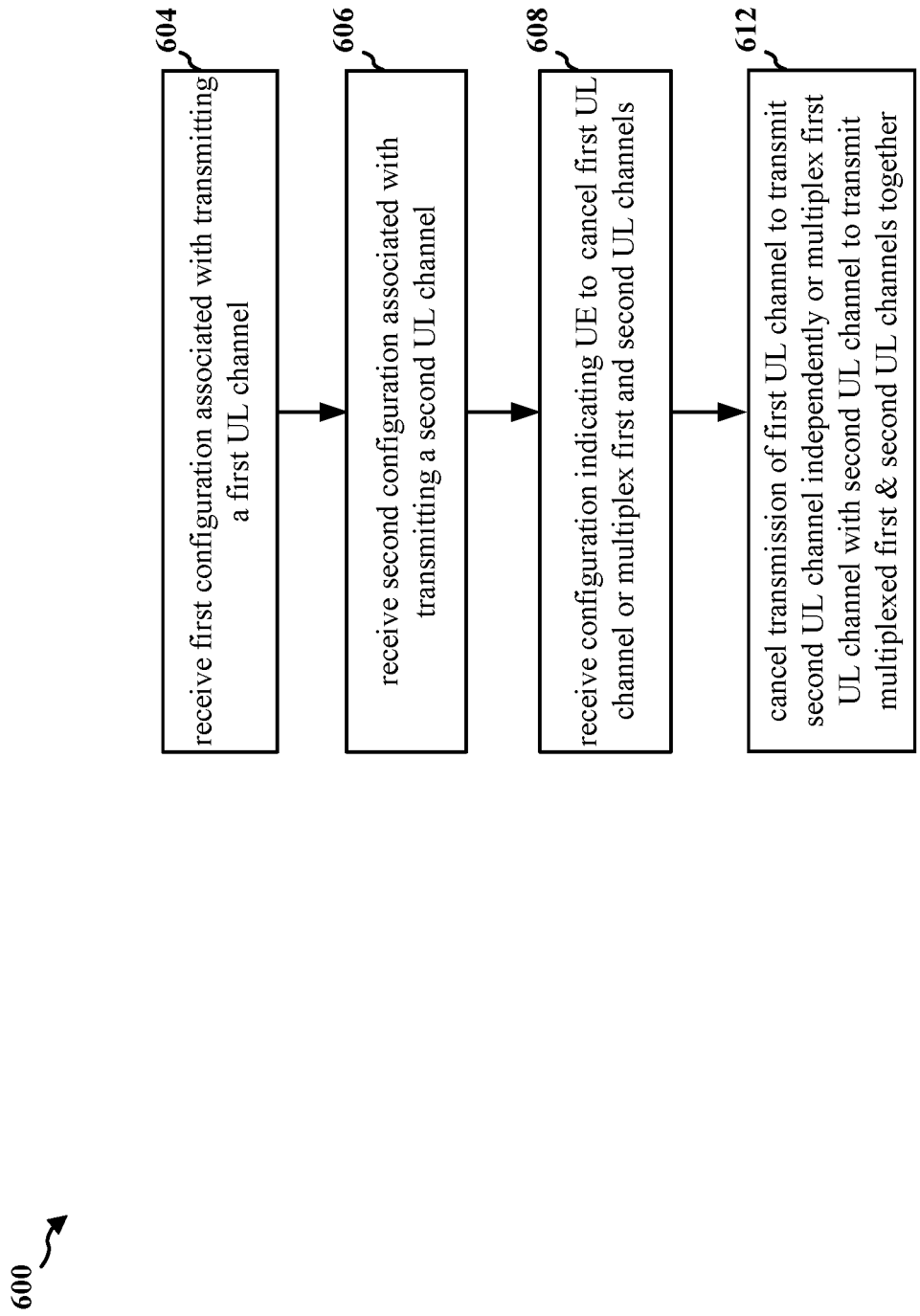
FIG. 6 is a flowchart of a method of wireless communication.

FIG. 6 is a flowchart 600 of a method of wireless communication. The method may be performed by a UE (e.g., the UE 104/402; the apparatus 1002). When a low priority UL channel and a high priority UL channel are scheduled to overlap or collide at least partially with each other, the UE may cancel the low priority UL channel or multiplex the low priority UL channel and the high priority UL channel based on a signal received from the base station.

At 604, the UE may receive, from the base station, a first configuration associated with transmitting a first UL channel to the base station, the first UL channel having a first priority. That is, the first configuration to the UE may include a grant from the base station to the UE scheduling a transmission of the first UL channel. The first priority may be a low priority. For example, the first UL channel may be one of a PUCCH that includes low priority HARQ-ACK/NACK, or a PUCCH that includes low priority CSI feedback. The configuration may be received through at least one of the RRC signaling, the MAC-CE, and/or the DCI. For example, at 408, the UE 402 may receive, from the base station 404, a first configuration associated with transmitting a first UL channel to the base station 404, the first UL channel having a first priority. Furthermore, 604 may be performed by a UL configuration component 1042.

At 606, the UE may receive, from the base station, a second configuration associated with transmitting a second UL channel to the base station concurrent in time with at least a part of the transmission of the first UL channel, the second UL channel having a second priority greater than the first priority. That is, the second configuration to the UE may include a grant from the base station to the UE scheduling a transmission of the second UL channel. The second priority may be a high priority. For example, the second UL channel may be one of a PUSCH that includes data, a PUCCH that includes high priority CSI feedback, or a PUSCH that includes data and high priority CSI feedback.

The configuration may be received through at least one of the RRC signaling, the MAC-CE, and/or the DCI. For example, at 410, the UE 402 may receive, from the base station 404, a second configuration associated with transmitting a second UL channel to the base station 404 concurrent in time with at least a part of the transmission of the first UL channel, the second UL channel having a second priority greater than the first priority. Furthermore, 606 may be performed by the UL configuration component 1042.

In one aspect, the base station may explicitly signal the UE and indicate the UE to follow one of the UL transmission behaviors for overlapping or colliding UL transmissions. At 608, the UE may receive, from the base station, a configuration indicating the UE to cancel the transmission of the first UL channel and transmit the second UL channel independently, or to multiplex the first UL channel with the second UL channel and transmit both the first UL channel and the second UL channel together. The base station may configure the UE to cancel the first UL channel or multiplex the first UL channel and the second UL channel based on the capability information received at 602. For example, at 412, the UE 402 may receive, from the base station 404, a configuration indicating the UE 402 to cancel the transmission of the first UL channel and transmit the second UL channel independently, or to multiplex the first UL channel with the second UL channel and transmit both the first UL channel and the second UL channel together. Furthermore, 608 may be performed by the UL configuration component 1042.

At 612, the UE may cancel the transmission of the first UL channel to transmit the second UL channel independently or multiplex the first UL channel with the second UL channel to transmit both the first UL channel and the second UL channel together based on the configuration received at 608 or the determination at 610. In one aspect, the UE may cancel the transmission of the first UL channel to transmit the second UL channel independently or multiplex the first UL channel with the second UL channel to transmit both the first UL channel and the second UL channel together based on the configuration received from the base station at 608. In another aspect, the UE may cancel the transmission of the first UL channel to transmit the second UL channel independently or multiplex the first UL channel with the second UL channel to transmit both the first UL channel and the second UL channel together based on the determination based on the at least one condition at 610. For example, at 415, the UE 402 may cancel the transmission of the first UL channel to transmit the second UL channel independently or multiplex the first UL channel with the second UL channel to transmit both the first UL channel and the second UL channel together based on the configuration received at 412 or the determination at 414. Furthermore, 612 may be performed by the UL transmission control component 1044.

Figure 7:
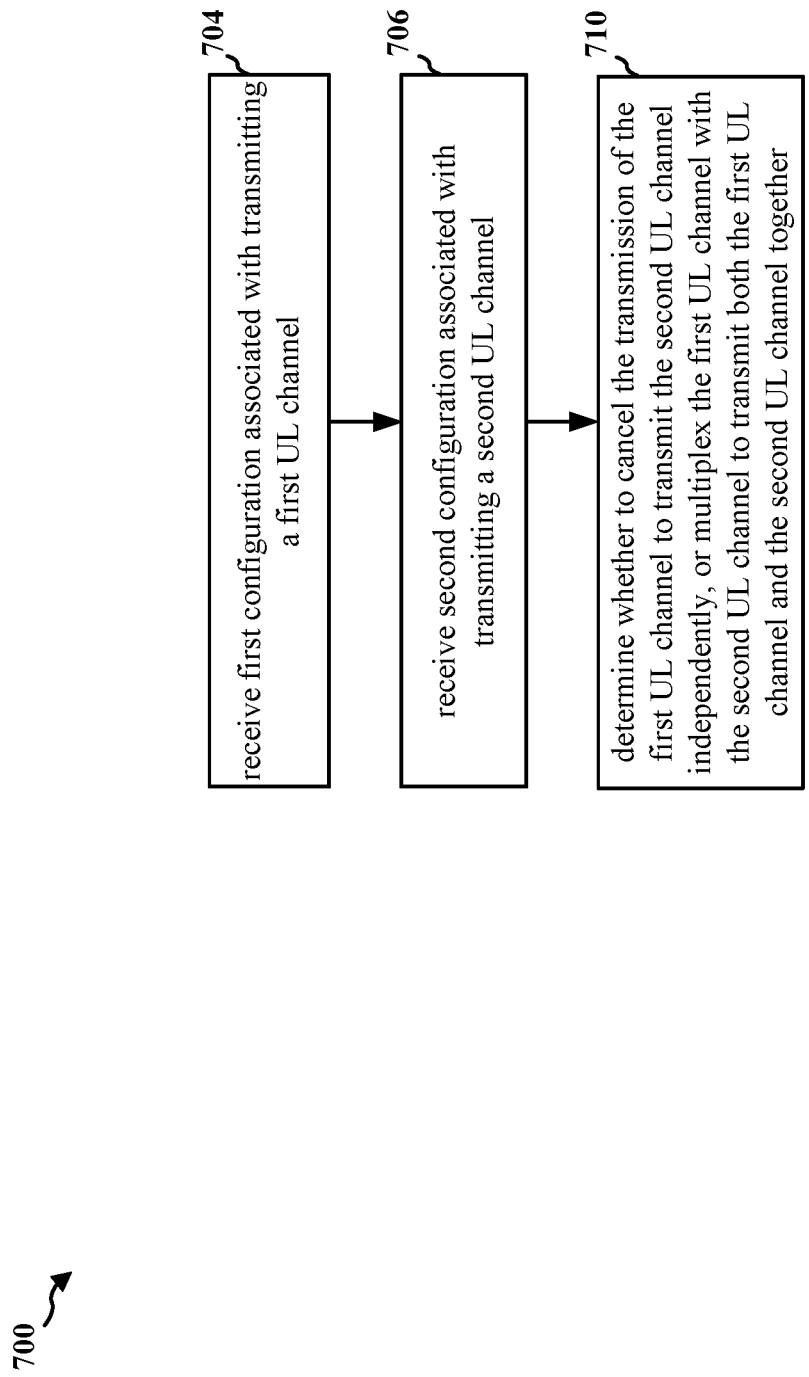
FIG. 7 is a flowchart of a method of wireless communication.

FIG. 7 is a flowchart 700 of a method of wireless communication. The method may be performed by a UE (e.g., the UE 104/402; the apparatus 1002). When a low priority UL channel and a high priority UL channel are scheduled to overlap or collide at least partially with each other, the UE may cancel the low priority UL channel or multiplex the low priority UL channel and the high priority UL channel based on at least one condition.

At 704, the UE may receive, from the base station, a first configuration associated with transmitting a first UL channel to the base station, the first UL channel having a first priority. That is, the first configuration to the UE may include a grant from the base station to the UE scheduling a transmission of the first UL channel. The first priority may be a low priority.

For example, the first UL channel may be one of a PUCCH that includes low priority HARQ-ACK/NACK, or a PUCCH that includes low priority CSI feedback. The configuration may be received through at least one of the RRC signaling, the MAC-CE, and/or the DCI. For example, at 408, the UE 402 may receive, from the base station 404, a first configuration associated with transmitting a first UL channel to the base station 404, the first UL channel having a first priority. Furthermore, 704 may be performed by a UL configuration component 1042.

At 706, the UE may receive, from the base station, a second configuration associated with transmitting a second UL channel to the base station concurrent in time with at least a part of the transmission of the first UL channel, the second UL channel having a second priority greater than the first priority. That is, the second configuration to the UE may include a grant from the base station to the UE scheduling a transmission of the second UL channel. The second priority may be a high priority. For example, the second UL channel may be one of a PUSCH that includes data, a PUCCH that includes high priority CSI feedback, or a PUSCH that includes data and high priority CSI feedback. The configuration may be received through at least one of the RRC signaling, the MAC-CE, and/or the DCI. For example, at 410, the UE 402 may receive, from the base station 404, a second configuration associated with transmitting a second UL channel to the base station 404 concurrent in time with at least a part of the transmission of the first UL channel, the second UL channel having a second priority greater than the first priority. Furthermore, 706 may be performed by the UL configuration component 1042.

In another aspect, the UE may decide which UL transmission behaviors to follow for the overlapping or colliding UL transmissions. At 710, the UE may determine whether to cancel the transmission of the first UL channel to transmit the second UL channel independently or to multiplex the first UL channel with the second UL channel to transmit both the first UL channel and the second UL channel together, based on at least one condition. The at least one condition may include a power headroom, a coding rate of multiplexed high priority data/UCI, and a percentage of resource in the multiplexed high UL channel that is taken by low priority UL transmissions. For example, at 414, the UE 402 may determine whether to cancel the transmission of the first UL channel to transmit the second UL channel independently or to multiplex the first UL channel with the second UL channel to transmit both the first UL channel and the second UL channel together, based on at least one condition. Furthermore, 710 may be performed by a UL transmission control component 1044.

Figure 8:
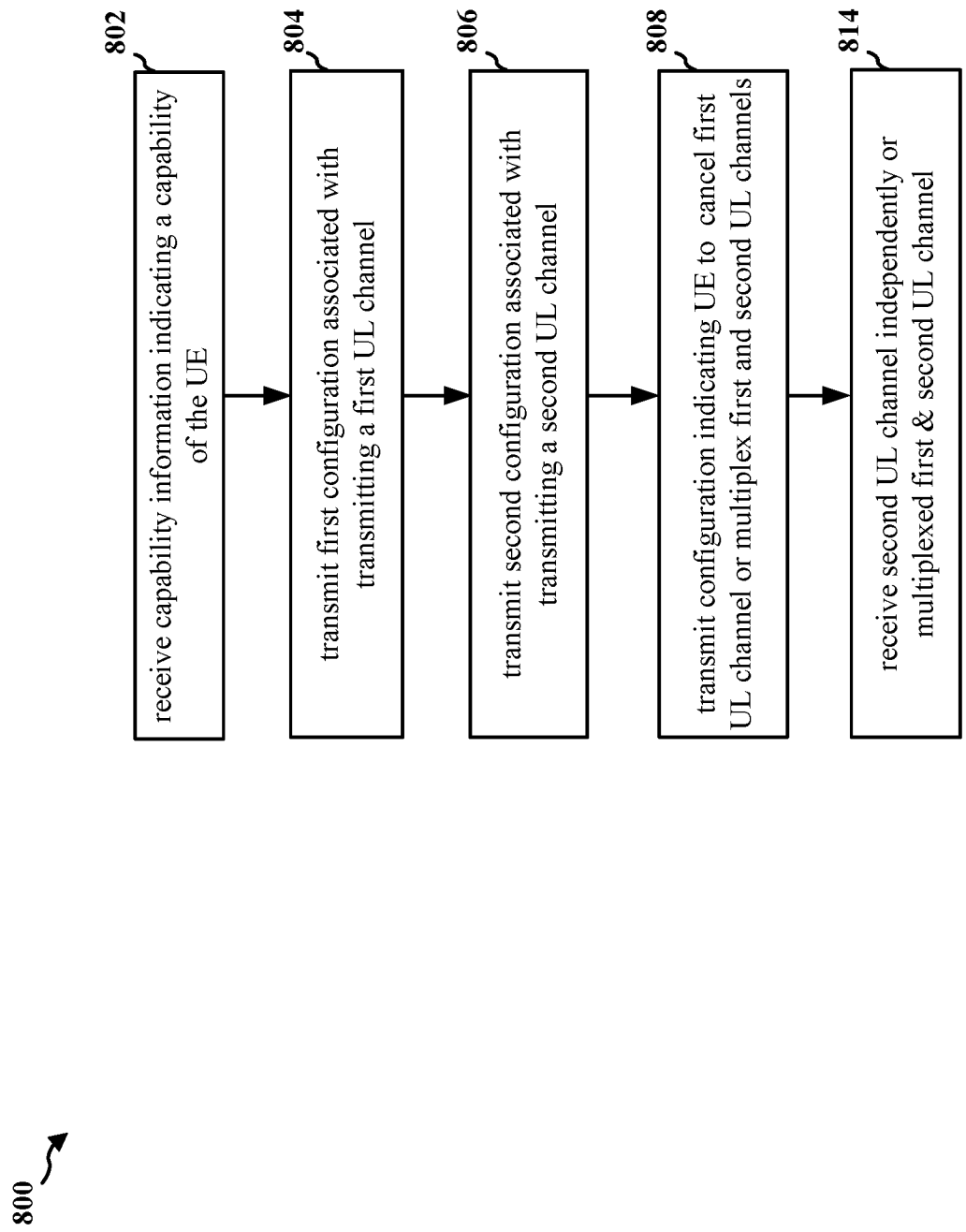
FIG. 8 is a flowchart of a method of wireless communication.

FIG. 8 is a flowchart 800 of a method of wireless communication. The method may be performed by a base station (e.g., the base station 102/180/404; the apparatus 1102). The base station may receive, from a UE, capability information indicating a capability of the UE and instruct the UE to cancel the transmission of a low priority UL channel to transmit a high priority UL channel independently, or multiplex the low priority UL channel with the high priority UL channel to transmit both the low priority UL channel and the high priority UL channel together when the low priority UL channel and a high priority UL channel are scheduled to overlap or collide at least partially with each other.

At 802, the base station may receive, from the UE, the capability information indicating a capability of the UE, the capability refers to whether the UE may support each of canceling the transmission of the low priority UL channel to transmit the high priority UL channel independently, or multiplexing the low priority UL channel with the high priority UL channel to transmit both the low priority UL channel and the high priority UL channel together. The base station may configure the UE to cancel the low priority UL channel or multiplex the low priority UL channel and the high priority UL channel based on the capability information received from the UE. For example, at 406, the base station 404 may receive, from the UE 402, the capability information indicating a capability of the UE 402, the capability refers to whether the UE 402 may support each of canceling the transmission of the low priority UL channel to transmit the high priority UL channel independently, or multiplexing the low priority UL channel with the high priority UL channel to transmit both the low priority UL channel and the high priority UL channel together. Furthermore, 802 may be performed by a UE capability indicating component 1140.

At 804, the base station may transmit, to the UE, a first configuration associated with receiving a first UL channel from the UE, the first UL channel having a first priority. That is, the first configuration to the UE may include a grant from the base station to the UE scheduling a transmission of the first UL channel. The first priority may be a low priority. For example, the first UL channel may be one of a PUCCH that includes low priority HARQ-ACK/NACK, or a PUCCH that includes low priority CSI feedback. The configuration may be received through at least one of the RRC signaling, the MAC-CE, and/or the DCI. For example, at 408, the base station 404 may transmit, to the UE 402, the first configuration associated with receiving the first UL channel from the UE 402, the first UL channel having a first priority. Furthermore, 804 may be performed by a UL configuration component 1142.

At 806, the base station may transmit, to the UE, a second configuration associated with receiving a second UL channel from the UE concurrent in time with at least a part of the transmission of the first UL channel, the second UL channel having a second priority greater than the first priority. That is, the second configuration to the UE may include a grant from the base station to the UE scheduling a transmission of the second UL channel. The second priority may be a high priority. For example, the second UL channel may be one of a PUSCH that includes data, a PUCCH that includes high priority CSI feedback, or a PUSCH that includes data and high priority CSI feedback. The configuration may be received through at least one of the RRC signaling, the MAC-CE, and/or the DCI. For example, at 410, the base station 404 may transmit, to the UE 402, a second configuration associated with receiving a second UL channel from the UE 402 concurrent in time with at least a part of the transmission of the first UL channel, the second UL channel having a second priority greater than the first priority. Furthermore, 806 may be performed by the UL configuration component 1142.

In one aspect, the base station may explicitly signal the UE and indicate the UE to follow one of the UL transmission behaviors for overlapping or colliding UL transmissions. At 808, the base station may transmit a configuration indicating the UE to cancel the transmission of the first UL channel a third and transmit the second UL channel independently, or to multiplex the first UL channel with the second UL channel and transmit both the first UL channel and the second UL channel together. The base station may configure the UE to cancel the first UL channel or multiplex the first UL channel and the second UL channel based on the capability information received at 802. For example, at 412, the base station 404 may transmit a configuration indicating the UE 402 to cancel the transmission of the first UL channel a third and transmit the second UL channel independently, or to multiplex the first UL channel with the second UL channel and transmit both the first UL channel and the second UL channel together. Furthermore, 808 may be performed by the UL configuration component 1142.

At 814, the base station may receive, from the UE, the second UL channel independent from the first UL channel or the first UL channel and the second UL channel multiplexed with each other. In one aspect, the UE may cancel the transmission of the first UL channel and transmit, to the base station, the second UL channel independently based on the configuration received from the base station or the determination based on the at least one condition. In another aspect, the UE may multiplex the first UL channel with the second UL channel and transmit, to the base station, both the first UL channel and the second UL channel together based on the configuration received from the base station or the determination based on the at least one condition. For example, at 416, the base station 404 may receive, from the UE 402, the second UL channel independent from the first UL channel or the first UL channel and the second UL channel multiplexed with each other. Furthermore, 814 may be performed by a UL reception control component 1144.

Figure 9:
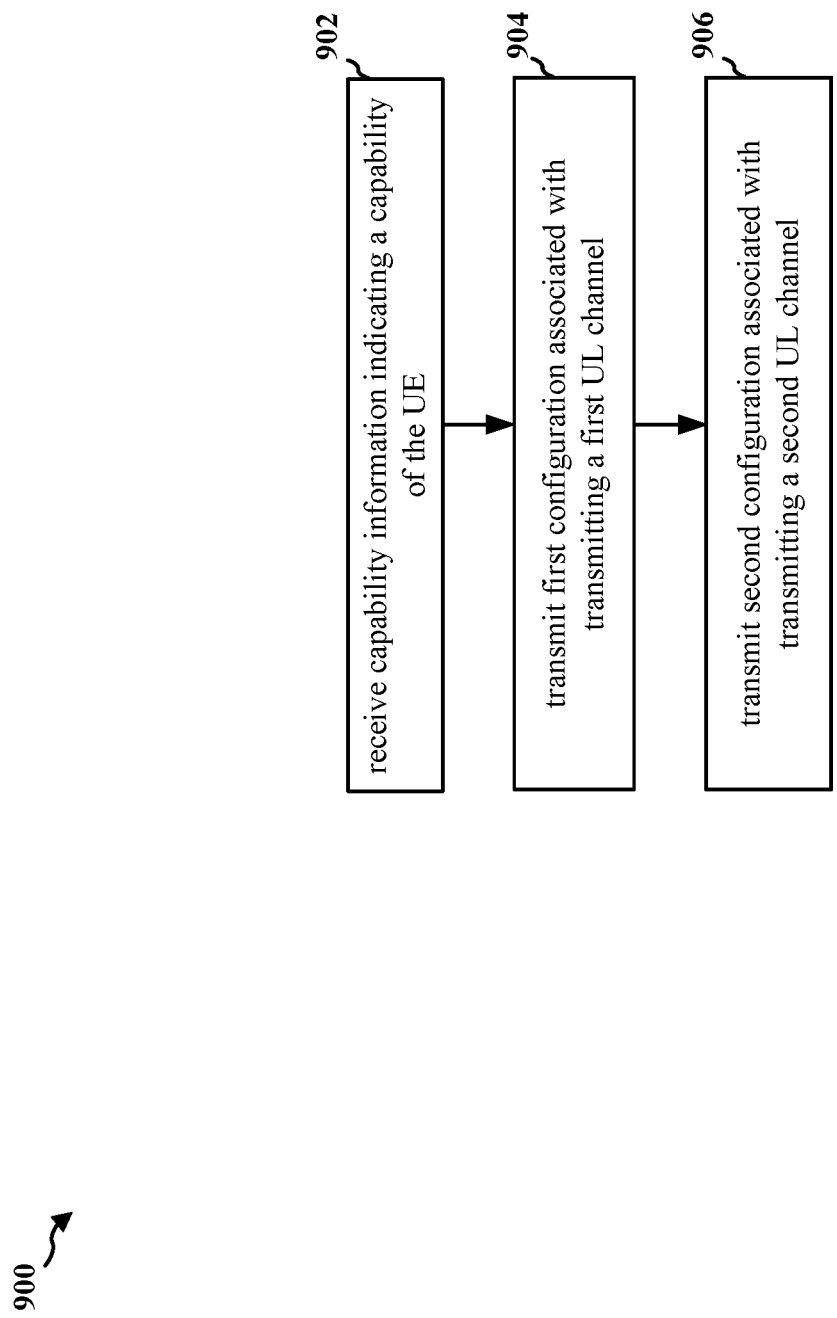
FIG. 9 is a flowchart of a method of wireless communication.

FIG. 9 is a flowchart 900 of a method of wireless communication. The method may be performed by a base station (e.g., the base station 102/180/404; the apparatus 1102). The base station may receive, from a UE, capability information indicating a capability of the UE and instruct the UE to cancel the transmission of a low priority UL channel to transmit a high priority UL channel independently, or multiplex the low priority UL channel with the high priority UL channel to transmit both the low priority UL channel and the high priority UL channel together when the low priority UL channel and a high priority UL channel are scheduled to overlap or collide at least partially with each other.

At 902, the base station may receive, from the UE, the capability information indicating a capability of the UE, the capability refers to whether the UE may support each of canceling the transmission of the low priority UL channel to transmit the high priority UL channel independently, or multiplexing the low priority UL channel with the high priority UL channel to transmit both the low priority UL channel and the high priority UL channel together. The base station may configure the UE to cancel the low priority UL channel or multiplex the low priority UL channel and the high priority UL channel based on the capability information received from the UE. For example, at 406, the base station 404 may receive, from the UE 402, the capability information indicating a capability of the UE 402, the capability refers to whether the UE 402 may support each of canceling the transmission of the low priority UL channel to transmit the high priority UL channel independently, or multiplexing the low priority UL channel with the high priority UL channel to transmit both the low priority UL channel and the high priority UL channel together. Furthermore, 902 may be performed by a UE capability indicating component 1140.

At 904, the base station may transmit, to the UE, a first configuration associated with receiving a first UL channel from the UE, the first UL channel having a first priority. That is, the first configuration to the UE may include a grant from the base station to the UE scheduling a transmission of the first UL channel. The first priority may be a low priority. For example, the first UL channel may be one of a PUCCH that includes low priority HARQ-ACK/NACK, or a PUCCH that includes low priority CSI feedback. The configuration may be received through at least one of the RRC signaling, the MAC-CE, and/or the DCI. For example, at 408, the base station 404 may transmit, to the UE 402, the first configuration associated with receiving the first UL channel from the UE 402, the first UL channel having a first priority. Furthermore, 904 may be performed by a UL configuration component 1142.

At 906, the base station may transmit, to the UE, a second configuration associated with receiving a second UL channel from the UE concurrent in time with at least a part of the transmission of the first UL channel, the second UL channel having a second priority greater than the first priority. That is, the second configuration to the UE may include a grant from the base station to the UE scheduling a transmission of the second UL channel. The second priority may be a high priority. For example, the second UL channel may be one of a PUSCH that includes data, a PUCCH that includes high priority CSI feedback, or a PUSCH that includes data and high priority CSI feedback. The configuration may be received through at least one of the RRC signaling, the MAC-CE, and/or the DCI. For example, at 410, the base station 404 may transmit, to the UE 402, a second configuration associated with receiving a second UL channel from the UE 402 concurrent in time with at least a part of the transmission of the first UL channel, the second UL channel having a second priority greater than the first priority. Furthermore, 906 may be performed by the UL configuration component 1142.

Figure 10:
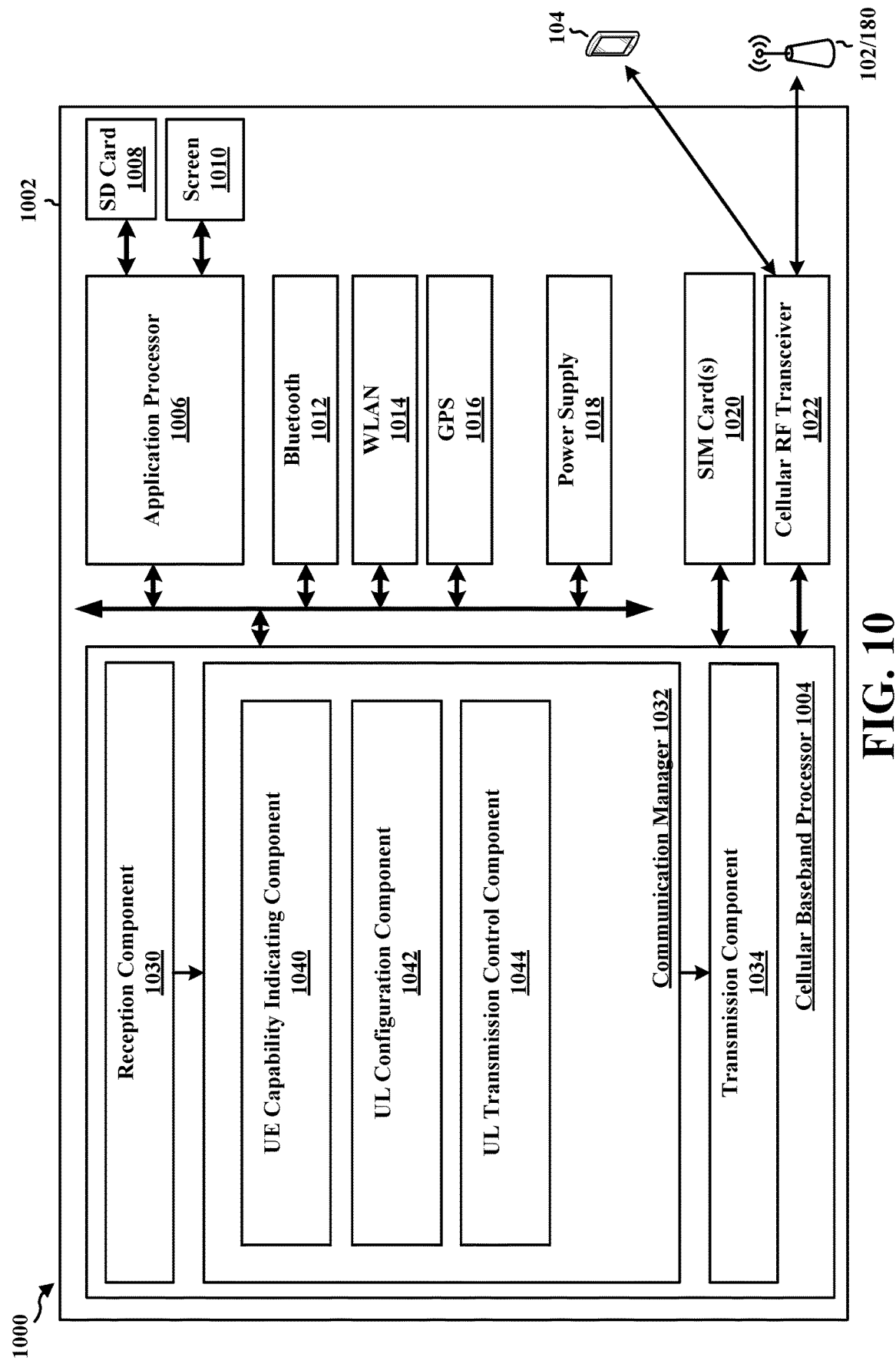
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a UE capability indicating component 1040 that is configured to transmit, to the base station, capability information indicating a capability of the UE, e.g., as described in connection with 502. The communication manager 1032 further includes a UL configuration component 1042 that is configured to receive a first configuration associated with transmitting a first UL channel to the base station and a second configuration associated with transmitting a second UL channel to the base station concurrent in time with at least a part of the transmission of the first UL channel, and receive a configuration indicating the UE to cancel the transmission of the first UL channel and transmit the second UL channel independently, or to multiplex the first UL channel with the second UL channel and transmit both the first UL channel and the second UL channel together, e.g., as described in connection with 504, 506, 508, 604, 606, 608, 704, and 706. The communication manager 1032 further includes a UL transmission control component 1044 that is configured to determine whether to cancel the transmission of the first UL channel to transmit the second UL channel independently or to multiplex the first UL channel with the second UL channel to transmit both the first UL channel and the second UL channel together, based on at least one condition or the received configuration, and cancel the transmission of the first UL channel and transmit the second UL channel independently upon determining to cancel the transmission of the first UL channel and transmit the second UL channel independently, or multiplex the first UL channel with the second UL channel and transmit both the first UL channel and the second UL channel together upon determining to multiplex the first UL channel with the second UL channel and transmit both the first UL channel and the second UL channel together, e.g., as described in connection with 510, 512, 514, 612, and 710.

The apparatus may include additional components that perform each of the blocks of the algorithm in the aforementioned flowcharts of FIGS. 4, 5, 6, and 7. As such, each block in the aforementioned flowcharts of FIGS. 4, 5, 6, and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving, from a base station, a first configuration associated with transmitting a first UL channel having a first priority, means for receiving, from the base station, a second configuration associated with transmitting a second UL channel concurrent in time with at least a part of a transmission of the first UL channel, the second UL channel having a second priority greater than the first priority, means for receiving, from the base station, a third configuration indicating the UE to cancel the transmission of the first UL channel and transmit the second UL channel independently, or to multiplex the first UL channel with the second UL channel and transmit both the first UL channel and the second UL channel together, means for cancelling the transmission of the first UL channel to transmit the second UL channel independently, or multiplex the first UL channel with the second UL channel to transmit both the first UL channel and the second UL channel together based on the third configuration received from the base station, and means for determining whether to cancel the transmission of the first UL channel to transmit the second UL channel independently, or to multiplex the first UL channel with the second UL channel to transmit both the first UL channel and the second UL channel together. The apparatus 1002 includes means for transmitting, to the base station, capability information indicating a capability of the UE, the capability refers to whether the UE supports each of canceling the transmission of the first UL channel to transmit the second UL channel independently, or multiplexing the first UL channel with the second UL channel to transmit both the first UL channel and the second UL channel together. The apparatus 1002 includes means for determining to cancel the transmission of the first UL channel and transmit the second UL channel independently based on the power headroom at the UE being equal to or less than a power headroom threshold, and means for determining to multiplex the first UL channel with the second UL channel and transmit both the first UL channel and the second UL channel together based on the power headroom at the UE being greater than the power headroom threshold. The apparatus 1002 includes means for determining to cancel the transmission of the first UL channel and transmit the second UL channel independently when the coding rate is greater than a coding rate threshold, and means for determining to multiplex the first UL channel with the second UL channel and transmit both the first UL channel and the second UL channel together when the coding rate is less than or equal to the coding rate threshold. The apparatus 1002 includes means for determining to cancel the transmission of the first UL channel and transmit the second UL channel independently when the percentage is greater than a percentage threshold, and means for determining to multiplex the first UL channel with the second UL channel and transmit both the first UL channel and the second UL channel together when the percentage is less than or equal to the percentage threshold. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
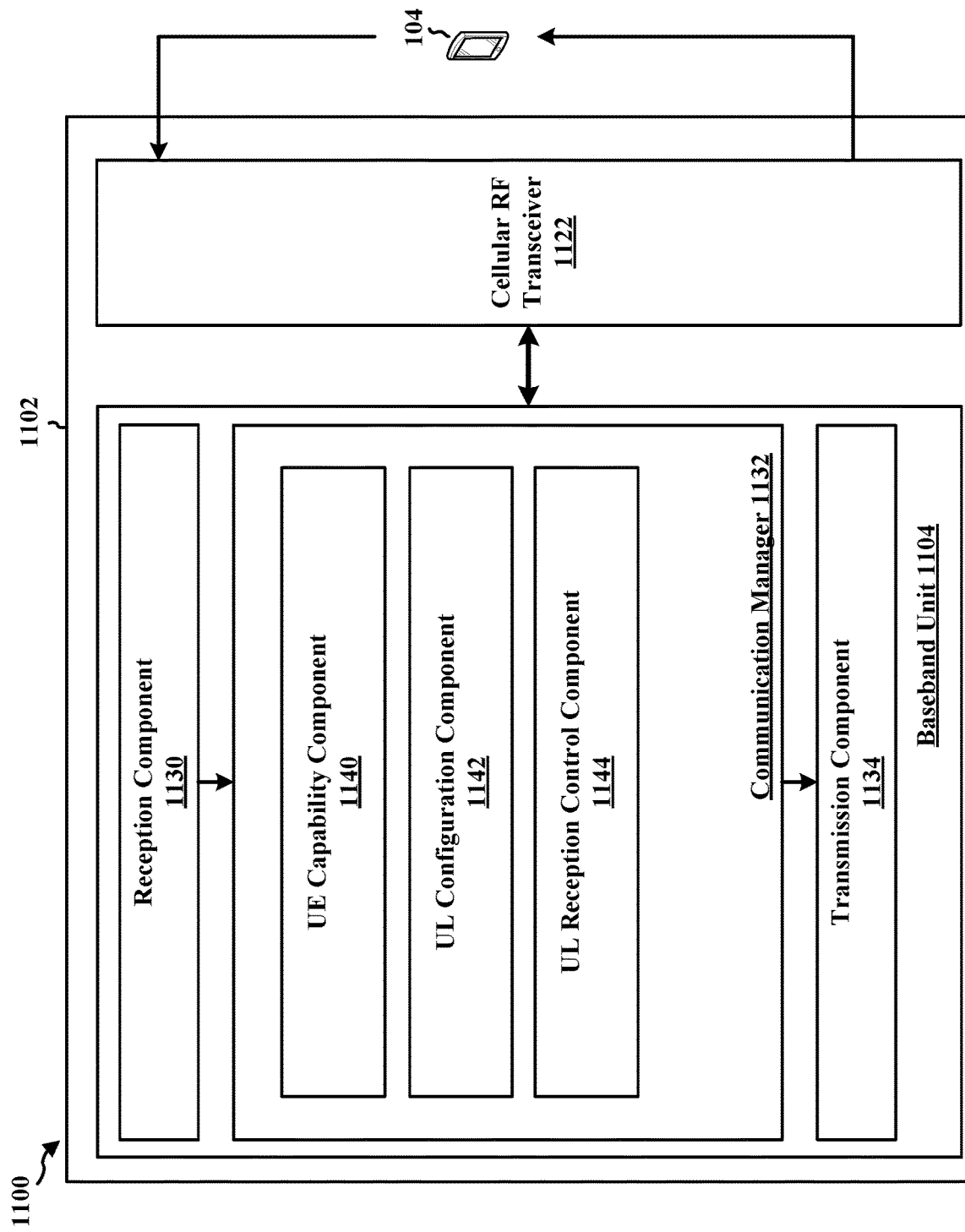
FIG. 11 is a diagram illustrating an example of a hardware implementation for an example apparatus.

FIG. 11 is a diagram 1100 illustrating an example of a hardware implementation for an apparatus 1102. The apparatus 1102 may be a base station, a component of a base station, or may implement base station functionality. In some aspects, the apparatus 1002 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a UE capability indicating component 1140 that is configured to receive, from the UE, the capability information indicating a capability of the UE, e.g., as described in connection with 802 and 902. The communication manager 1132 further includes a UL configuration component 1142 that is configured to transmit, to the UE, a first configuration associated with receiving a first UL channel from the UE and a second configuration associated with receiving a second UL channel from the UE concurrent in time with at least a part of the transmission of the first UL channel, and transmit configuration indicating the UE to cancel the transmission of the first UL channel a third and transmit the second UL channel independently, or to multiplex the first UL channel with the second UL channel and transmit both the first UL channel and the second UL channel together, e.g., as described in connection with 804, 806, 808, 904, and 906. The communication manager 1132 further includes a UL reception control component 1144 that is configured to receive, from the UE, the second UL channel independent from the first UL channel or the first UL channel and the second UL channel multiplexed with each other, e.g., as described in connection with 810.

The apparatus may include additional components that perform each of the blocks of the algorithm in the flowcharts of FIGS. 4, 8, and 9. As such, each block in the flowcharts of FIGS. 4, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for receiving, from to a UE, capability information indicating a capability of the UE, the capability being whether the UE supports each of canceling a transmission of a first UL channel and transmitting a second UL channel independently, or multiplexing the first UL channel with the second UL channel and transmitting both the first UL channel and the second UL channel together, means for transmitting, to the UE, a first configuration associated with receiving a first UL channel having a first priority, means for transmitting, to the UE, a second configuration associated with receiving a second UL channel concurrent in time with at least a part of the transmission of the first UL channel, the second UL channel having a second priority greater than the first priority. The apparatus 1102 includes means for transmitting, to the UE, a third configuration indicating the UE to cancel the transmission of the first UL channel and transmit the second UL channel independently, or to multiplex the first UL channel with the second UL channel and transmit both the first UL channel and the second UL channel together. The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

A UE may be configured to determining to transmit a low priority UL channel, determine to transmit a high priority UL channel concurrent in time with at least a part of the transmission of the low priority UL channel, and determine whether to cancel the transmission of the low priority UL channel to transmit the high priority UL channel independently or to multiplex the low priority UL channel with the high priority UL channel to transmit both the low priority UL channel and the high priority UL channel together based on conditions or configuration from the base station, based on at least one conditions or a configuration received from the base station. For example, the at least one condition may include a power headroom, a coding rate of multiplexed high priority UL channel, and a percentage of resource in the multiplexed high UL channel that is taken by low priority UL channel. The UE may also transmit capability information indicating a capability of the UE to the base station, and receive a configuration from the base station.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive, from a base station, a first configuration associated with transmitting a first UL channel having a first priority, receive, from the base station, a second configuration associated with transmitting a second UL channel concurrent in time with at least a part of a transmission of the first UL channel, the second UL channel having a second priority greater than the first priority, receive, from the base station, a third configuration indicating the UE to cancel the transmission of the first UL channel and transmit the second UL channel independently, or to multiplex the first UL channel with the second UL channel and transmit both the first UL channel and the second UL channel together, and cancel the transmission of the first UL channel to transmit the second UL channel independently, or multiplex the first UL channel with the second UL channel to transmit both the first UL channel and the second UL channel together based on the third configuration received from the base station.

Aspect 2 is the apparatus of aspect 1, where the at least one processor and the memory are further configured to transmit, to the base station, capability information indicating a capability of the UE, the capability refers to whether the UE supports each of canceling the transmission of the first UL channel to transmit the second UL channel independently, or multiplexing the first UL channel with the second UL channel to transmit both the first UL channel and the second UL channel together.

Aspect 3 is the apparatus of any of aspects 1 and 2, where the third configuration is received through one of RRC signaling, a MAC-CE, or DCI.

Aspect 4 is a method of wireless communication for implementing any of aspects 1 to 3.

Aspect 5 is an apparatus for wireless communication including means for implementing any of aspects 1 to 3.

Aspect 6 is a computer-readable medium storing computer executable code, where the code when executed by a processor causes the processor to implement any of aspects 1 to 3.

Aspect 7 is an apparatus for wireless communication including at least one processor coupled to a memory and configured to receive, from a base station, a first configuration associated with transmitting a first UL channel having a first priority, receive, from the base station, a second configuration associated with transmitting a second UL channel concurrent in time with at least a part of a transmission of the first UL channel, the second UL channel having a second priority greater than the first priority, and determine whether to cancel the transmission of the first UL channel to transmit the second UL channel independently, or to multiplex the first UL channel with the second UL channel to transmit both the first UL channel and the second UL channel together.

Aspect 8 is the apparatus of aspect 7, where the determination whether to cancel the transmission of the first UL channel and transmit the second UL channel independently, or to multiplex the first UL channel with the second UL channel and transmit both the first UL channel and the second UL channel together is made at the UE and is based on a power headroom at the UE.

Aspect 9 is the apparatus of aspect 8, where, to determine whether to cancel the transmission of the first UL channel and transmit the second UL channel independently, or to multiplex the first UL channel with the second UL channel and transmit both the first UL channel and the second UL channel together, the at least one processor and the memory are further configured to determine to cancel the transmission of the first UL channel and transmit the second UL channel independently based on the power headroom at the UE being equal to or less than a power headroom threshold, and determine to multiplex the first UL channel with the second UL channel and transmit both the first UL channel and the second UL channel together based on the power headroom at the UE being greater than the power headroom threshold.

Aspect 10 is the apparatus of aspect 9, where the determination whether to cancel the transmission of the first UL channel and transmit the second UL channel independently, or to multiplex the first UL channel with the second UL channel and transmit both the first UL channel and the second UL channel together is made at the UE and is based on a coding rate of the second UL channel when multiplexed with the first UL channel.

Aspect 11 is the apparatus of aspect 10, where, to determine whether to cancel the transmission of the first UL channel and transmit the second UL channel independently, or to multiplex the first UL channel with the second UL channel and transmit both the first UL channel and the second UL channel, the at least one processor and the memory are further configured to determine to cancel the transmission of the first UL channel and transmit the second UL channel independently when the coding rate is greater than a coding rate threshold, and determine to multiplex the first UL channel with the second UL channel and transmit both the first UL channel and the second UL channel together when the coding rate is less than or equal to the coding rate threshold.

Aspect 12 is the apparatus of any of aspects 7 to 11, where the determination whether to cancel the transmission of the first UL channel and transmit the second UL channel independently, or to multiplex the first UL channel with the second UL channel and transmit both the first UL channel and the second UL channel together is made at the UE and is based on a percentage of resources assigned to the first UL channel within resources for the second UL channel.

Aspect 13 is the apparatus of aspect 12, where, to determine whether to cancel the transmission of the first UL channel and transmit the second UL channel independently, or to multiplex the first UL channel with the second UL channel and transmit both the first UL channel and the second UL channel together, the at least one processor and the memory are further configured to determine to cancel the transmission of the first UL channel and transmit the second UL channel independently when the percentage is greater than a percentage threshold, and determine to multiplex the first UL channel with the second UL channel and transmit both the first UL channel and the second UL channel together when the percentage is less than or equal to the percentage threshold.

Aspect 14 is a method of wireless communication for implementing any of aspects 7 to 13.

Aspect 15 is an apparatus for wireless communication including means for implementing any of aspects 7 to 13.

Aspect 16 is a computer-readable medium storing computer executable code, where the code when executed by a processor causes the processor to implement any of aspects 7 to 13.

Aspect 17 is an apparatus for wireless communication including at least one processor coupled to a memory and configured to receive, from to a UE, capability information indicating a capability of the UE, the capability being whether the UE supports each of canceling a transmission of a first UL channel and transmitting a second UL channel independently, or multiplexing the first UL channel with the second UL channel and transmitting both the first UL channel and the second UL channel together, transmit, to the UE, a first configuration associated with receiving a first UL channel having a first priority, transmit, to the UE, a second configuration associated with receiving a second UL channel concurrent in time with at least a part of the transmission of the first UL channel, the second UL channel having a second priority greater than the first priority, where the first UL channel is canceled or multiplexed with the second UL channel.

Aspect 18 is the apparatus of aspect 17, where the at least one processor and the memory are further configured to transmit, to the UE, a third configuration indicating the UE to cancel the transmission of the first UL channel and transmit the second UL channel independently, or to multiplex the first UL channel with the second UL channel and transmit both the first UL channel and the second UL channel together.

Aspect 19 is the apparatus of aspect 18, where the third configuration is transmitted through one of RRC signaling, a MAC-CE, or DCI.

Aspect 20 is the apparatus of any of aspects 17 to 19, where the determination to cancel the transmission of the first UL channel or to multiplex the first UL channel with the second UL channel is made at the UE based on a power headroom at the UE.

Aspect 21 is the apparatus of aspect 20, where the transmission of the first UL channel is cancelled and the second UL channel independently received based on the power headroom at the UE being equal to or less than a power headroom threshold, and where the first UL channel is multiplexed with the second UL channel and both of the first UL channel and the second UL channel are received together based on the power headroom at the UE being greater than the power headroom threshold.

Aspect 22 is the apparatus of any of aspects 20 and 21, where the determination to cancel the transmission of the first UL channel or to multiplex the first UL channel with the second UL channel is made at the UE based on a coding rate of the second UL channel when multiplexed with the first UL channel.

Aspect 23 is the apparatus of aspect 22, where the transmission of the first UL channel is cancelled and the second UL channel independently received based on the coding rate of the second UL channel when multiplexed with the first UL channel being greater than a coding rate threshold, and where the first UL channel is multiplexed with the second UL channel and both of the first UL channel and the second UL channel are received together based on the coding rate of the second UL channel when multiplexed with the first UL channel being less than or equal to the coding rate threshold.

Aspect 24 is the apparatus of any of aspects 20 to 23, where the determination to cancel the transmission of the first UL channel or to multiplex the first UL channel with the second UL channel is made at the UE based on a percentage of resources assigned to the first UL channel within resources for the second UL channel.

Aspect 25 is the apparatus of aspect 24, where the transmission of the first UL channel is cancelled and the second UL channel independently received based on the percentage of resources assigned to the first UL channel within resources for the second UL channel being greater than a percentage threshold, and where the first UL channel is multiplexed with the second UL channel and both of the first UL channel and the second UL channel are received together based on the percentage of resources assigned to the first UL channel within resources for the second UL channel being less than or equal to the percentage threshold.

Aspect 26 is a method of wireless communication for implementing any of aspects 17 to 25.

Aspect 27 is an apparatus for wireless communication including means for implementing any of aspects 17 to 25.

Aspect 28 is a computer-readable medium storing computer executable code, where the code when executed by a processor causes the processor to implement any of aspects 17 to 25.

What is claimed is:

1. An apparatus for wireless communication at a user equipment (UE), comprising:
   a memory; and
   at least one processor coupled to the memory, the at least one processor and the memory configured to:
      receive, from a base station, a first configuration associated with transmitting a first uplink (UL) channel having a first priority;
      receive, from the base station, a second configuration associated with transmitting a second UL channel concurrent in time with at least a part of a transmission of the first UL channel, the second UL channel having a second priority greater than the first priority;
      receive, from the base station, a third configuration indicating the UE to cancel the transmission of the first UL channel and transmit the second UL channel independently, or to multiplex the first UL channel with the second UL channel and transmit both the first UL channel and the second UL channel together; and
      cancel the transmission of the first UL channel to transmit the second UL channel independently, or multiplex the first UL channel with the second UL channel to transmit both the first UL channel and the second UL channel together based on the third configuration received from the base station.

2. The apparatus of claim 1, wherein the at least one processor and the memory are further configured to:
   transmit, to the base station, capability information indicating a capability of the UE, the capability refers to whether the UE supports each of cancelling the transmission of the first UL channel to transmit the second UL channel independently, or multiplexing the first UL channel with the second UL channel to transmit both the first UL channel and the second UL channel together.

3. The apparatus of claim 2, wherein the third configuration is received through one of radio resource control (RRC) signaling, a media access control (MAC) control element (CE) (MAC-CE), or downlink control information (DCI).

4. The apparatus of claim 1, further comprising a transceiver coupled to the at least one processor.

5. An apparatus for wireless communication at a user equipment (UE), comprising:
   a memory; and
   at least one processor coupled to the memory, the at least one processor and the memory configured to:
      receive, from a base station, a first configuration associated with transmitting a first uplink (UL) channel having a first priority;
      receive, from the base station, a second configuration associated with transmitting a second UL channel concurrent in time with at least a part of a transmission of the first UL channel, the second UL channel having a second priority greater than the first priority; and
      determine whether to cancel the transmission of the first UL channel to transmit the second UL channel independently, or to multiplex the first UL channel with the second UL channel to transmit both the first UL channel and the second UL channel together.

6. The apparatus of claim 5, wherein the determination whether to cancel the transmission of the first UL channel and transmit the second UL channel independently, or to multiplex the first UL channel with the second UL channel and transmit both the first UL channel and the second UL channel together is made at the UE and is based on a power headroom at the UE.

7. The apparatus of claim 6, wherein, to determine whether to cancel the transmission of the first UL channel and transmit the second UL channel independently, or to multiplex the first UL channel with the second UL channel and transmit both the first UL channel and the second UL channel together, the at least one processor and the memory are further configured to:
   determine to cancel the transmission of the first UL channel and transmit the second UL channel independently based on the power headroom at the UE being equal to or less than a power headroom threshold; and
   determine to multiplex the first UL channel with the second UL channel and transmit both the first UL channel and the second UL channel together based on the power headroom at the UE being greater than the power headroom threshold.

8. The apparatus of claim 5, wherein the determination whether to cancel the transmission of the first UL channel and transmit the second UL channel independently, or to multiplex the first UL channel with the second UL channel and transmit both the first UL channel and the second UL channel together is made at the UE and is based on a coding rate of the second UL channel when multiplexed with the first UL channel.

9. The apparatus of claim 8, wherein, to determine whether to cancel the transmission of the first UL channel and transmit the second UL channel independently, or to multiplex the first UL channel with the second UL channel and transmit both the first UL channel and the second UL channel, the at least one processor and the memory are further configured to:
   determine to cancel the transmission of the first UL channel and transmit the second UL channel independently when the coding rate is greater than a coding rate threshold; and determine to multiplex the first UL channel with the second UL channel and transmit both the first UL channel and the second UL channel together when the coding rate is less than or equal to the coding rate threshold.

10. The apparatus of claim 5, wherein the determination whether to cancel the transmission of the first UL channel and transmit the second UL channel independently, or to multiplex the first UL channel with the second UL channel and transmit both the first UL channel and the second UL channel together is made at the UE and is based on a percentage of resources assigned to the first UL channel within resources for the second UL channel.

11. The apparatus of claim 10, wherein, to determine whether to cancel the transmission of the first UL channel and transmit the second UL channel independently, or to multiplex the first UL channel with the second UL channel and transmit both the first UL channel and the second UL channel together, the at least one processor and the memory are further configured to:
    determine to cancel the transmission of the first UL channel and transmit the second UL channel independently when the percentage is greater than a percentage threshold; and
    determine to multiplex the first UL channel with the second UL channel and transmit both the first UL channel and the second UL channel together when the percentage is less than or equal to the percentage threshold.

12. The apparatus of claim 5, further comprising a transceiver coupled to the at least one processor.

13. An apparatus for wireless communication at a base station, comprising:
    a memory; and
    at least one processor coupled to the memory, the at least one processor and the memory configured to:
        receive, from to a user equipment (UE), capability information indicating a capability of the UE, the capability being whether the UE supports each of cancelling a transmission of a first UL channel and transmitting a second UL channel independently, or multiplexing the first UL channel with the second UL channel and transmitting both the first UL channel and the second UL channel together;
        transmit, to the UE, a first configuration associated with receiving a first uplink (UL) channel having a first priority; and
        transmit, to the UE, a second configuration associated with receiving a second UL channel concurrent in time with at least a part of the transmission of the first UL channel, the second UL channel having a second priority greater than the first priority,
    wherein the first UL channel is canceled or multiplexed with the second UL channel.

14. The apparatus of claim 13, wherein the at least one processor and the memory are further configured to:
    transmit, to the UE, a third configuration indicating the UE to cancel the transmission of the first UL channel and transmit the second UL channel independently, or to multiplex the first UL channel with the second UL channel and transmit both the first UL channel and the second UL channel together.

15. The apparatus of claim 14, wherein the third configuration is transmitted through one of radio resource control (RRC) signaling, a media access control (MAC) control element (CE) (MAC-CE), or downlink control information (DCI).

16. The apparatus of claim 13, wherein a determination to cancel the transmission of the first UL channel or to multiplex the first UL channel with the second UL channel is made at the UE based on a power headroom at the UE.

17. The apparatus of claim 16, wherein the transmission of the first UL channel is cancelled and the second UL channel independently received based on the power headroom at the UE being equal to or less than a power headroom threshold,
    wherein the first UL channel is multiplexed with the second UL channel and both of the first UL channel and the second UL channel are received together based on the power headroom at the UE being greater than the power headroom threshold.

18. The apparatus of claim 16, wherein the determination to cancel the transmission of the first UL channel or to multiplex the first UL channel with the second UL channel is made at the UE based on a coding rate of the second UL channel when multiplexed with the first UL channel.

19. The apparatus of claim 18, wherein the transmission of the first UL channel is cancelled and the second UL channel independently received based on the coding rate of the second UL channel when multiplexed with the first UL channel being greater than a coding rate threshold,
    wherein the first UL channel is multiplexed with the second UL channel and both of the first UL channel and the second UL channel are received together based on the coding rate of the second UL channel when multiplexed with the first UL channel being less than or equal to the coding rate threshold.

20. The apparatus of claim 16, wherein the determination to cancel the transmission of the first UL channel or to multiplex the first UL channel with the second UL channel is made at the UE based on a percentage of resources assigned to the first UL channel within resources for the second UL channel.

21. The apparatus of claim 20, wherein the transmission of the first UL channel is cancelled and the second UL channel independently received based on the percentage of resources assigned to the first UL channel within resources for the second UL channel being greater than a percentage threshold,
    wherein the first UL channel is multiplexed with the second UL channel and both of the first UL channel and the second UL channel are received together based on the percentage of resources assigned to the first UL channel within resources for the second UL channel being less than or equal to the percentage threshold.

22. The apparatus of claim 13, further comprising a transceiver coupled to the at least one processor.

23. A method of wireless communication at a user equipment (UE), comprising:
    receiving, from a base station, a first configuration associated with transmitting a first uplink (UL) channel having a first priority;
    receiving, from the base station, a second configuration associated with transmitting a second UL channel concurrent in time with at least a part of a transmission of the first UL channel, the second UL channel having a second priority greater than the first priority; and
    determining whether to cancel the transmission of the first UL channel to transmit the second UL channel independently, or to multiplex the first UL channel with the second UL channel to transmit both the first UL channel and the second UL channel together.

24. The method of claim 23, wherein the determination whether to cancel the transmission of the first UL channel and transmit the second UL channel independently, or to multiplex the first UL channel with the second UL channel and transmit both the first UL channel and the second UL channel together is made at the UE and is based on a power headroom at the UE.

25. The method of claim 24, wherein the determination whether to cancel the transmission of the first UL channel and transmit the second UL channel independently, or to multiplex the first UL channel with the second UL channel and transmit both the first UL channel and the second UL channel together comprises:
  determining to cancel the transmission of the first UL channel and transmit the second UL channel independently based on the power headroom at the UE being equal to or less than a power headroom threshold; and
  determining to multiplex the first UL channel with the second UL channel and transmit both the first UL channel and the second UL channel together based on the power headroom at the UE being greater than the power headroom threshold.

26. The method of claim 23, wherein the determination whether to cancel the transmission of the first UL channel and transmit the second UL channel independently, or to multiplex the first UL channel with the second UL channel and transmit both the first UL channel and the second UL channel together is made at the UE and is based on a coding rate of the second UL channel when multiplexed with the first UL channel.

27. The method of claim 26, wherein the determination whether to cancel the transmission of the first UL channel and transmit the second UL channel independently, or to multiplex the first UL channel with the second UL channel and transmit both the first UL channel and the second UL channel together comprises:
  determining to cancel the transmission of the first UL channel and transmit the second UL channel independently when the coding rate is greater than a coding rate threshold; and
  determining to multiplex the first UL channel with the second UL channel and transmit both the first UL channel and the second UL channel together when the coding rate is less than or equal to the coding rate threshold.

28. The method of claim 23, wherein the determination whether to cancel the transmission of the first UL channel and transmit the second UL channel independently, or to multiplex the first UL channel with the second UL channel and transmit both the first UL channel and the second UL channel together is made at the UE and is based on a percentage of resources assigned to the first UL channel within resources for the second UL channel.

29. The method of claim 28, wherein the determination whether to cancel the transmission of the first UL channel and transmit the second UL channel independently, or to multiplex the first UL channel with the second UL channel and transmit both the first UL channel and the second UL channel together comprises:
  determining to cancel the transmission of the first UL channel and transmit the second UL channel independently when the percentage is greater than a percentage threshold; and
  determining to multiplex the first UL channel with the second UL channel and transmit both the first UL channel and the second UL channel together when the percentage is less than or equal to the percentage threshold.

* * * * *